United States Patent
Yoneda et al.

(10) Patent No.: US 6,943,222 B2
(45) Date of Patent: Sep. 13, 2005

(54) TEMPERATURE-CONTROLLED PROCESS OF PRODUCING POLYMER

(75) Inventors: Atsuro Yoneda, Suita (JP); Shigeru Yamaguchi, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/760,383

(22) Filed: Jan. 21, 2004

(65) Prior Publication Data

US 2004/0152854 A1 Aug. 5, 2004

(30) Foreign Application Priority Data

Jan. 22, 2003 (JP) .................................. P. 2003-013574
Dec. 22, 2003 (JP) .................................. P. 2003-425114

(51) Int. Cl.$^7$ ................................................ C08F 2/16
(52) U.S. Cl. .................. 526/63; 526/221; 526/234; 526/317.1
(58) Field of Search .................. 526/63, 221, 234, 526/317.1

(56) References Cited

U.S. PATENT DOCUMENTS 3,646,099 A  2/1972  Dannals
5,760,129 A * 6/1998 Lau ............................. 524/732
6,310,156 B1 10/2001 Maeda et al.

FOREIGN PATENT DOCUMENTS

JP   11-315115 A    11/1999
JP   2001-192404 A   7/2001

OTHER PUBLICATIONS

Chemical Abstracts, "Manufacture of High–Molecular--Weight Watersoluble Polymers as Flocculating Agents", (1998), vol. 110, No. 14, p. 14.

European Search Report dated Jul. 7, 2004.

* cited by examiner

Primary Examiner—William K. Cheung
(74) Attorney, Agent, or Firm—Sughrue Mion, PLLC

(57) ABSTRACT

A process of producing a polymer by aqueous solution polymerization with good productivity without causing the formation of noxious gases or the formation of impurities due to the noxious gases, or without any danger of foaming and the like is disclosed. The process includes subjecting a monomer to aqueous solution polymerization while controlling the temperature using at least one device of an external circulation device and an internal coil device each having heat exchanging function.

17 Claims, 1 Drawing Sheet

TEMPERATURE-CONTROLLED PROCESS OF PRODUCING POLYMER

FIELD OF THE INVENTION

The present invention relates to a temperature-controlled process of producing a polymer in aqueous solution polymerization using water as the major solvent.

DESCRIPTION OF THE RELATED ART

In polymerization reaction, the polymerization reaction is generally carried out while removing a reaction heat. In solution polymerization using a solvent as the polymerization solvent, it is known that since the reaction is carried out while refluxing the solvent, heat removal of a polymerization heat is easy, and it is easy to control the polymerization temperature as compared with block polymerization.

However, even if the solution polymerization is employed, in the case where a radical polymerizable monomer which is liable to proceed with polymerization reaction is polymerized, a phenomenon wherein the internal temperature of a reactor rises at a stretch from the target temperature due to a polymerization heat of the radical polymerizable monomer is liable to occur. Since the rise of the internal temperature due to the polymerization heat also increases a decomposition speed of a polymerization initiator, the polymerization reaction further abruptly proceeds. When the polymerization temperature once starts to rise, a polymer having desired characteristics may not be obtained. Also, in serious case, there is some possibility of explosion.

The reasons why a polymer having desired characteristics is not obtained reside in the matter that gelation of a polymer occurs due to three-dimensional conversion of polymer chains, or even though gelation does not occur, the polymerization initiator is decomposed at a stroke, whereby the concentration of radicals against the monomer becomes too high, thereby forming a large amount of oligomers.

In aqueous solution polymerization using water as the major polymerization solvent, there is generally employed a method in which water, a monomer, a polymerization initiator, and various other additives as the need arises are charged in a polymerizer equipped with a jacket and a reflux condenser, and cooling water is passed through the jacket and the reflux condenser to remove a polymerization heat, thereby controlling the reaction system at a fixed temperature at atmospheric pressure. During this, problems such as foaming caused due to deterioration of the heat removing ability are solved by adjusting the cooling ability of the reflux condenser or the degree of heating of the polymerizer, or the like. Further, as described in JP-A-2001-192404, in order to enhance productivity and reproducibility in an actual machine plant, there is known a technology of obtaining a water-soluble polymer by specifying an adequate steam linear velocity based on a weight average molecular weight of the finally objective polymer and keeping the foaming state within a fixed level.

However, according to the conventional heat removal method, it is difficult to control the polymerization temperature at not higher than the boiling point in a simple method. In particular, in recent years, since the proportion of a heating surface area to the polymerization reaction product lowers with an increase in the size of a polymerizer, it is difficult to effectively carry out the heat removal by the conventional cooling means. For that reason, there was involved a problem such that the polymerization temperature rises with the progress of polymerization, whereby the reaction temperature during polymerization becomes high.

Especially, it has become clear that in the aqueous solution polymerization wherein the monomer concentration (concentration of polymerizable unsaturated bonds), it is important to control the polymerization temperature at not higher than the boiling point. If the polymerization temperature cannot be controlled, there is a problem such that a polymerization initiator to be used is limited. For example, in the case where aqueous solution polymerization is carried out using a polymerization initiator capable of generating a gas at the time of polymerization reaction, such as a bisulfite, if the polymerization temperature is high, in the manufacturing step, a large amount of the bisulfite as the initiator is generated as sulfurous acid gas, and a large amount of the sulfurous acid gas that is not dissolved in the liquid phase is discharged out the system. Accordingly, for the sake of absorbing the sulfurous acid gas on an adsorbing agent or the like and treating it as a waste, costs for recovery are required. Also, since the bisulfite as the initiator comes out as sulfurous acid gas so that the effect is reduced, the molecule weight of the polymer does not decrease, a large amount of the total of the initiator is necessary, and many impurities are formed. As a result, it has become clear that the resulting polymer cannot sufficiently reveal a high performance which the polymer originally has, resulting in new problems such as a lowering in the performance and deposition of impurities at the time of retention at low temperatures.

When polymerization is carried out at the boiling point, depending upon a polymerization initiator to be used, large foaming may possibly occur, leading to danger, and such is often not preferable.

In manufacturing while controlling the polymerization temperature in aqueous solution polymerization, in order to take a balance between a quantity of heat generated by polymerization reaction, etc. and a quantity of heat removal, a method of performing the manufacture by making the reaction time extremely long or making the concentration of the reaction solution extremely low may be considered. However, this method involves a problem such that the productivity is too low for obtaining a high-concentration polymer.

Further, a method of reducing the pressure within a reactor to control the reaction temperature at a temperature at which a solvent is refluxed or at a temperature at which a mixture of a solvent and a radical polymerizable monomer is refluxed may be considered. However, in the case of using a chain transfer agent which becomes a gas-liquid equilibrium state, such as a bisulfite, this method of reducing the pressure involves a problem such that not only the concentration of sulfurous acid (salt) presented in the liquid phase, which may directly contribute to the reaction, lowers, but also sulfurous acid gas present in the gas phase is taken out. Also, according to this method, since even though the temperature is controlled, the reaction solution is in the boiling state, there is still danger of foaming.

Under these circumstances, even in the aqueous solution polymerization, not only it was necessary to merely remove the reaction heat or take a balance between the heat removal and the heat generation, but also it was necessary to positively control the reaction temperature surely at a fixed temperature.

As described previously, in general, when the size of equipment increases from the experimental scale to the industrial scale, that is, the size of a polymerization reactor increases so that the amount of a monomer to be used increases, an efficiency of the heat removal is reduced. Therefore, it becomes difficult to quickly lower the reaction temperature. Thus, it is an extremely important issue from the standpoint of actual works to remove the polymerization heat.

Accordingly, a first embodiment of the invention is to provide a process of producing a polymer by aqueous solution polymerization with good productivity without causing the formation of noxious gases or the formation of impurities due to the noxious gases, or without any danger of foaming and the like.

The present inventors made extensive and insensitive investigations about possibility of controlling the polymerization temperature at a temperature not higher than the boiling point in aqueous solution polymerization. As a result, it has been found that the foregoing object can be achieved by the following constitutions.

(1) A process of producing a polymer comprising subjecting a monomer to aqueous solution polymerization while controlling the temperature using at least one device of an external circulation device and an internal coil device each having heat exchanging function.
(2) The process of producing a polymer as set forth above in (1), wherein the monomer is a (meth)acrylic acid based monomer.
(3) The process of producing a polymer as set forth above in (1) or (2), wherein the polymerization temperature is 50° C. or higher but lower than the boiling point.
(4) The process of producing a polymer as set forth above in any one of (1) to (3), wherein the polymerization reaction solution contains a heavy metal ion.
(5) The process of producing a polymer as set forth above in (4), wherein the heavy metal ion is an iron ion.
(6) The process of producing a polymer as set forth above in any one of (1) to (5), wherein the polymerization reaction is carried out while adding the monomer for an addition period of time in the range of from 1 to 8 hours.
(7) The process of producing a polymer as set forth above in any one of (1) to (6), wherein the polymerization reaction solution has a viscosity of not more than 1,000 mPa·s.
(8) The process of producing a polymer as set forth above in any one of (1) to (7), wherein a solution flow rate of the external circulation device is from 0.01 to 15% by volume of the total charge amount of the polymer solution per minute.
(9) The process of producing a polymer as set forth above in any one of (1) to (8), wherein the external circulation device preferably has an outlet temperature of from 10 to 90° C.
(10) The process of producing a polymer as set forth above in any one of (1) to (9), wherein a solution holding amount of the external circulation device is from 1 to 30% by volume of the total charge amount of the polymer solution.
(11) The process of producing a polymer as set forth above in any one of (1) to (7), wherein a cooling medium within the internal coil device preferably has a temperature of from 0° C. to 90° C.

According to the invention, by controlling the polymerization temperature using an internal coil device and/or an external circulation device each having heat exchanging function, it becomes first possible to positive control the polymerization temperature in aqueous solution polymerization using water as the major solvent. Further, the invention is successful in obtaining a high-concentration polymer with good productivity without causing the formation of noxious gases or the formation of impurities due to the noxious gases, or without any danger of foaming and the like.

Especially, the heat removal method using an external circulation device is high in an efficiency of heat removal and does not require a complicated internal structure. Therefore, the volume of a reactor can be utilized at its maximum, heat removal at the initial stage of polymerization is easy, and maintenance such as cleaning is easy. Also, it is easy to set up an external circulation device in current reactors, and therefore, the heat removal method using an external circulation device is preferable from the viewpoints of labor, time and cost in the construction.

In the polymerization method of the invention, the reaction may be carried out while dropping a radical polymerizable monomer or charging it en bloc, or a combination of charge en bloc and dropping. In the invention, a method of carrying out the polymerization while dropping a monomer is preferable because it is easy to control the molecular weight. The addition time of the monomer is not particularly limited but is preferably from 1 to 8 hours, and especially preferably from 2 to 6 hours. When the addition time of the monomer falls within this range, an effect of heat removal is high, and hence, such is preferable.

In the invention, it is preferable that the polymerization temperature is 50° C. or more but lower than the boiling point from the viewpoints of an efficiency of heat removal and productivity.

Also, the polymerization reaction solution preferably has a viscosity of not more than 1,000 mPa·s, and more preferably not more than 100 mPa·s from the viewpoints of an efficiency of heat removal and a load to a circulation pump.

As an example of the radical polymerization to be carried out in the invention, the case of using (meth)acrylic acid and/or a salt thereof as the radical polymerizable monomer is enumerated. Since these monomers have such a characteristic that they are readily polymerized, an effect of controlling the temperature according to the invention is especially remarkably obtained.

In addition, in the process of producing a water-soluble polymer according to the invention, it is preferable that the polymerization reaction solution contains a heavy metal ion, especially preferably an iron ion. When the polymerization reaction solution contains a heavy metal ion, an efficiency of an initiator is enhanced so that it is possible to synthesize a polymer using a smaller amount of the initiator. In other words, in synthesizing polymers having the same molecular weight from the same monomer, the amount of an initiator to be used can be reduced. As a result, it is possible to reduce the amount of impurities derived from the initiator, which are contained in a water-soluble polymer.

According to this process, it is possible to effectively reduce impurities by an easy measure for adding a heavy metal ion to the polymerization reaction solution. Therefore, the equipment costs generated in applying the process on an industrial scale are relatively small, and the competitive power of products to be produced is increased. Also, since the content of impurities in the resulting water-soluble polymer is low, the quality of products to which the water-soluble polymer is applied is enhanced. Further, if the amount of the initiator to be used is small, such is advantageous from the standpoint of manufacturing costs. Moreover, if the amount of an initiator to be used is reduced, since the amount of sulfurous acid gas generated from the polymerization reaction solution can be reduced, safety in the polymerization reaction is improved.

According to first embodiment of the invention, it is possible to produce a polymer by aqueous solution polymerization with good productivity without causing the formation of noxious gases or the formation of impurities due to the noxious gases, or without any danger of foaming and the like.

A second embodiment of the invention is to provide a means for reducing an amount of impurities contained in a (meth)acrylylic acid based polymer.

It has been found that this object can be achieved by the following constitutions.

(12) A process for producing a (meth)acrylylic acid based polymer by polymerizing a (meth)acrylylic acid based monomer in a polymerization reaction solution, wherein the polymerization reaction solution contains one or more of a persulfate and one or more of a bisulfite as the initiator, and the polymerization reaction solution contains heavy metal ions.

(13) The process for producing a (meth)acrylylic acid based polymer as set forth above in (12), wherein the heavy metal ions are iron ions.

The production process according to the second embodiment of the invention can effectively reduce impurities by a simple measure of adding a heavy metal ion to the polymerization reaction solution. For that reason, the equipment costs required in industrially applying the production process are relatively small, thereby increasing the competitive power of a product to be manufactured.

In the (meth)acrylic acid based polymer produced using the production process of the invention, the content of impurities is small. For that reason, the quality of a product to which the (meth)acrylic acid based polymer is applied is improved.

What the amount of an initiator to be used is small is advantageous from the standpoint of manufacturing costs. Further, when the amount of the initiator to be used is reduced, it is possible to reduce the amount of sulfurous acid gas generated from the polymerization reaction solution. For that reason, the safety in the polymerization reaction is improved.

For the sake of reducing impurities contained in the (meth)acrylic acid based polymer to be produced, the present inventors have made extensive and intensive investigations and paid attention to impurities formed due to a persulfate and a bisulfite to be used as the initiator in the synthesis of a (meth)acrylic acid based polymer, leading to accomplishment of the invention.

As described previously, by using a persulfate and a bisulfite as the initiator, it is possible to efficiently produce a (meth)acrylic acid based polymer having a low molecular weight. However, for example, in the case where sodium persulfate is used as the persulfate, sodium sulfate is formed as an impurity. As means for suppressing the formation of such an impurity, means for reducing the use amount of a persulfate or bisulfite as the raw material of the impurity may be considered. However, when the use amount of the persulfate or bisulfite is reduced, the weight average molecular weight of the (meth)acrylic acid based polymer to be formed increases due to a shortage of the initiator. For example, in the case where the (meth)acrylic acid based polymer is used as a detergent builder, it is desired to suppress an excessive increase of the molecular weight. Also, a method of producing a (meth)acrylic acid based polymer having a low weight average molecular weight is required from the standpoint of improving the degree of freedom of synthesis.

The present inventors have found that by containing a heavy metal ion in the polymerization reaction solution, the amount of a persulfate or bisulfite to be used can be reduced. Though its mechanism is not clear, by containing a heavy metal ion in the polymerization reaction solution, the persulfate and the bisulfite can improve the efficiency as the initiator. Thus, it is possible to advance the reaction to the same extent as in the conventional technologies using a small amount of a persulfate and/or a bisulfite. When the amount of the persulfate and/or the bisulfite to be used as the initiator is reduced, the amount of formed impurities is also reduced. Further, since the amount of the heavy metal ion to be added for obtaining the effect of the invention is very small, impurities derived from the heavy metal ion are not substantially formed.

In the process according to the second method of the present invention, at least one device of an external circulation device and an internal coil device each having heat exchanging function may be used or may not be used. However, it is preferable to use such a device.

Figure 1:
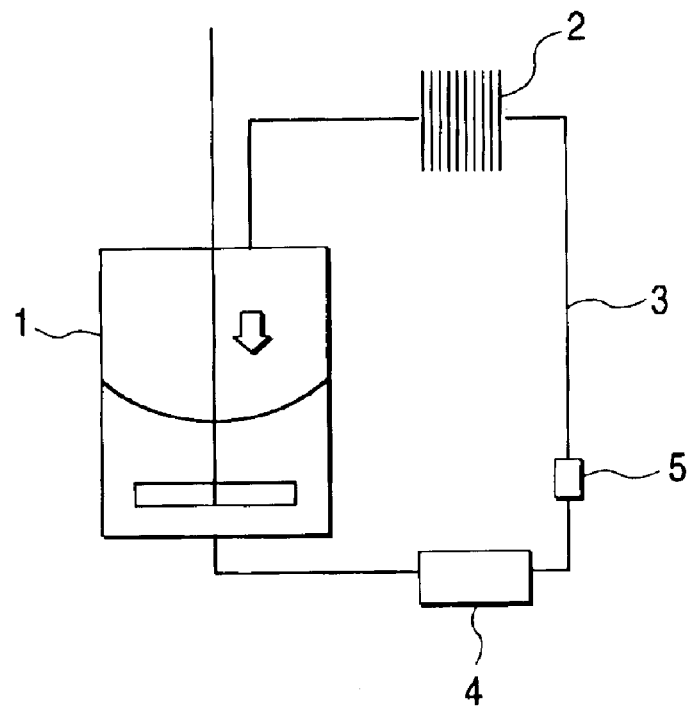
FIG. 1 is a schematic view to show an example of a polymerization apparatus for suitably carrying out the production process using an external circulation device according to the invention.

1: Polymerizer
2: Heat exchanger
3: Circulation conduit
4: Circulation pump
5: Volume flow meter
11: Polymerizer
12: Internal coil
13: Circulation conduit
14: Circulation pump
15: Volume flow meter
16: Temperature controller

DETAILED DESCRIPTION OF THE INVENTION

The first embodiment and second embodiment of the invention are described in detail below.

First Embodiment:

The process of the invention is largely characterized by controlling the temperature in aqueous solution polymerization using an external circulation device and/or an internal coil device each having heat exchanging function.

The aqueous solution polymerization as referred to in the invention means uniform solution polymerization using water as the major solvent. According to the invention, by controlling the temperature of aqueous solution polymerization using an external circulation device and/or an internal coil device, it becomes first possible to effectively control the polymerization temperature at a temperature lower than the boiling point of an aqueous solvent with good productivity.

In the invention, it is a major premise to carry out aqueous solution polymerization by radical polymerization in the presence of a solvent comprising water as the major solvent. Besides water, an organic solvent may be contained. As such an organic solvent, those capable of dissolving a radical polymerizable monomer and a polymer formed by polymerization can be used without particular limitations.

Specific examples include monohydric alcohols such as methanol, ethanol, propanol, isopropyl alcohol, butanol, pentanol, hexanol, cyclohexanol, methylcyclohexanol, and benzyl alcohol; polyhydric alcohols and derivatives thereof such as ethylene glycol, propylene glycol, ethylene glycol diacetate, ethylene glycol dimethyl ether, ethylene glycol diethyl ether, ethylene glycol dibutyl ether, ethylene glycol monomethyl ether, ethylene glycol monoethyl ether, ethylene glycol monomethyl ether acetate, ethylene glycol monoethyl ether acetate, diethylene glycol, diethylene glycol diacetate, propylene glycol monomethyl ether, propylene glycol monoethyl ether, propylene glycol monobutyl ether, propylene glycol monomethyl ether acetate, and glycerin; ketone based solvents such as acetone, methyl ethyl ketone, diisobutyl ketone, diisopropyl ketone, diethyl ketone, cyclohexanone, and methyl isobutyl ketone; ester based solvents such as methyl acetoacetate, ethyl acetoacetate, methyl benzoate, ethyl benzoate, ethyl acetate, and butyl acetate; and hydrocarbon based solvents such as benzene, toluene, xylene, and cyclohexane. With respect to these organic solvents, the use is not limited to a single usage, but for the purpose of adjusting the boiling point or adjusting the solubility, a mixture of two or more organic solvents may be used in combination with water. The mixing proportion of the organic solvent to water may be properly set up while taking into consideration the solubility of a polymer and in general, is preferably not more than 10% by weight.

As the radical polymerizable monomer that is used in the process of the invention, monomers that are radical polymerizable can be used without particular limitations. Specifically, (meth)acrylates such monohydric (meth) acrylates (such as methyl (meth)acrylate, ethyl (meth) acrylate, butyl (meth)acrylate, hexyl (meth)acrylate, 2-ethylhexyl (meth)acrylate, lauryl (meth)acrylate, tridecyl (meth)acrylate, stearyl (meth)acrylate, cyclohexyl (meth) acrylate, dimethylaminoethyl (meth)acrylate, ethylaminoethyl (meth)acrylate, glycidyl (meth)acrylate, tetrahydrofurfuryl (meth)acrylate, and allyl (meth)acrylate); polyhydric (meth)acrylates (such as triethylene glycol di(meth)acrylate, tetraethylene glycol di(meth)acrylate, pentyl glycol di(meth)acrylate, dipropylene glycol di(meth) acrylate, trimethylolpropane di(meth)acrylate, trimethylolpropane tri(meth)acrylate, pentaerythritol tri(meth) acrylate, and pentaerythritol tetra(meth)acrylate); and (meth)acrylic acid are preferably enumerated. These radical polymerizable monomers can be properly selected and used singly or in admixture of two or more thereof.

Also, any known radical polymerizable monomers such as aromatic monomers (such as styrene and α-methylstyrene); vinyl esters (such as vinyl acetate and vinyl propionate); nitrogen group-containing monomers (such as N-vinylpyrrolidone and acryloyl morpholine); nitrile group-containing monomers (such as (meth) acrylonitrile); amide based monomers (such as (meth) acrylamide and N-methylolacrylamide); carboxyl group-containing monomers (such as itaconic acid, crotonic acid, maleic anhydride, and maleic acid); hydroxyl group-containing monomers (such as 2-hydroxyethyl (meth) acrylate); and epoxy group-containing monomers (such as glycidyl (meth)acrylate) can be used.

In the case where it is required to adjust the molecular weight of a polymer, a chain transfer agent may be used. The chain transfer agent is not particularly limited. Examples include mercapto group-containing compounds such as sulfurous acid (and salts thereof), hydrosulfurous acid (and salts thereof), pyrosulfurous acid (and salts thereof), phosphorous acid (and salts thereof), hypophosphorous acid (and salts thereof), thioglycollic acid, octyl thioglycollate, thiopropionic acid, octyl thiopropionate, n-dodecyl mercaptan, t-dodecyl mercaptan, ethylene glycol dithioglycollate, ethylene glycol dithiopropionate, 1,4-butanediol thioglycollate, trimethylolpropane trithioglycollate, trimethylolpropane trithiopropionate, pentaerythritol tetrakisthioglycollate, pentaerythritol tetrakisthiopropionate, dipentaerythritol hexakisthioglycollate, and dipentaerythritol hexakisthiopropionate.

Examples of polymerization initiators that can be used in the aqueous solution polymerization of the invention include persulfates (such as sodium persulfate, ammonium persulfate, and potassium persulfate); hydrogen peroxide; azo based compounds (such as 2,2'-azobis(2-aminopropane) dihydrochloride, 4,4'-azobis(4-cyanovaleric acid), azobisisobutyronitrile, and 2,2'-azobis-(4-methoxy-2,4-dimethylvaleronitr and organic peroxides (such as benzoyl peroxide, lauroyl peroxide, peracetic acid, persuccinic acid, di-t-butyl peroxide, t-butyl hydroperxide, and cumene hydroperoxide). These polymerization initiators may be contained singly or in admixture of two or more thereof. Of these, persulfates, hydrogen peroxide, organic peroxides, and 2,2'-azobis(2-aminodipropane) dihydrochloride are preferable; persulfates, hydrogen peroxide, and 2,2'-azobis (2-aminopropane) dihydrochloride are more preferable; and persulfates and 2,2'-azobis-(2-aminopropane) dihydrochloride are further preferable.

In the invention, it is preferable that a heavy metal ion is compounded in the polymerization reaction solution. In this way, it is possible to reduce the amount of the polymerization initiator to be compounded, especially a persulfate and a bisulfite.

The heavy metal as referred to herein means a metal having a specific gravity of 4 $g/cm^3$ or more. Specific examples of heavy metals include iron, cobalt, manganese, chromium, molybdenum, tungsten, copper, silver, gold, lead, platinum, iridium, osmium, palladium, rhodium, and ruthenium. Two or more heavy metals may be used. The polymerization reaction solution preferably contains such an iron, and more preferably an iron ion. The valency of the heavy metal ion is not particularly limited. For example, in the case where iron is used as the heavy metal, the iron ion dissolved in the polymerization reaction solution may be $Fe^{2+}$ or $Fe^{3+}$, a combination thereof.

It is preferable to add the heavy metal ion using a solution having a heavy metal compound dissolved therein. The heavy metal compound that is used herein is determined according to the heavy metal ion that is desired to be contained in the polymerization reaction solution. In the case where water is used as the solvent, water-soluble heavy metal salts are preferable. Examples of water-soluble heavy metal slats include a Mohr's salt $(Fe(NH_4)_2(SO_4)_2.6H_2O)$, ferrous sulfate heptahydrate, ferrous chloride, ferric chloride, and manganese chloride.

The content of the heavy metal ion is not particularly limited but is preferably from 0.1 to 30 ppm, more preferably from 0.1 to 10 ppm, and further preferably from 0.1 to 5 ppm based on the total weight of the polymerization reaction solution at the time of completion of the polymerization reaction. The time of completion of the polymerization reaction as referred to herein means the time when the polymerization reaction is substantially completed in the polymerization reaction solution, thereby obtaining the desired polymer. For example, in the case where the polymerized polymer is neutralized with an alkaline component in the polymerization reaction solution, the content of the heavy metal ion is calculated based on the total weight of the polymerization reaction solution after neutralization. In the case where two or more heavy metal ions are contained, the total amount of the heavy metal ions may fall within the foregoing range.

When the content of the heavy metal ion falls with the foregoing range, an effect of the addition of the heavy metal ion can be sufficiently revealed without causing deterioration of the color tone of the polymer. Also, when the content of the heavy metal ion is too high, stains when used as a detergent builder or scales when used as a scale preventive may possibly increase, and hence, such is not preferable.

As the polymerization method, any of a method of charging a monomer en bloc and carrying out polymerization using a polymerization solvent comprising water as the major solvent, a method of carrying out polymerization while dropping a monomer, and a method of charging a part of a monomer en bloc and then carrying out polymerization while dropping the residual monomer can be employed. With respect to the polymerization initiator, a method of charging the initiator together with a monomer en bloc and carrying out polymerization, a method of charging a monomer en bloc and carrying out polymerization while dropping the initiator, and a method of carrying out polymerization while dropping the initiator together with a monomer (including charging of a part thereof and dropping of a part thereof) can be properly selected.

The ratio of the solvent and the monomer to be used is not particularly limited, but the whole amount of the monomer is preferably not more than 200 parts by weight, more preferably not more than 150 parts by weight, and further preferably not more than 100 parts by weight based on 100 parts by weight of the solvent.

In the invention, it is preferable that the polymerization temperature is controlled at 50° C. or higher but lower than the boiling point of the reaction solution. When the polymerization temperature falls within this range, cheap general-purpose polymerization initiators can be used, and hence, such is preferable. The polymerization temperature is more preferably 60° C. or higher but lower than the boiling point, further preferably from 70° C. to 98° C., and especially preferably from 80° C. to 95° C.

When the monomer is converted into a polymer with the progress of polymerization, since the mixing ratio of the solvent and the monomer within a reactor changes, the boiling delicately changes. However, when the polymerization reaction temperature is controlled at a fixed level, the decomposition rate of the polymerization initiator can be made at a fixed level, and the polymerization uniformly proceeds, and hence, such is preferable. Then, it is preferable to carry out the polymerization while detecting the temperature of the reactant by a temperature sensor, adjusting the temperature of a heat exchanger corresponding to the detected value, and subjecting the temperature within the reactor to feedback control such that it is substantially coincident with the target polymerization temperature (for example, at T° C.). A standard of the control range is preferably (T° C.±10° C.), more preferably (T° C.±5° C.), and further preferably (T° C.±3° C.).

Also, in a reactor for producing a polymer solution of 1 m$^3$ or more, since heat dissipation from the reactor surface is reduced, in particular, an effect of heat removal is liable to reveal by an external circulation device, and hence, such is preferable. The reactor is more preferably 5 m$^3$ or more, and further preferably 10 m$^3$ or more.

The reactor for polymerization may be a reactor equipped with a reflux condenser for the sake of safety. Also, in the case of dropping the monomer and/or the polymerization initiator (usually, dissolving in an organic solvent or monomer and dropping in the solution state), dropping means such as a dropping funnel may be provided.

Next, the temperature control method according to the invention will be described below in detail.

In the invention, the temperature is controlled using at least one device of an external circulation device and an internal coil device each having heat exchanging function.

First of all, a method of controlling the temperature using an external circulation device having heat exchanging function will be described below.

The external circulation device has a heat exchanger, and this external circulation method is to pass an aqueous polymerization mixture through the heat exchanger provided outside a polymerizer and to circulate it. Since the external circulation device is efficient from the standpoint that a heat transfer area coming into contact with the aqueous polymerization mixture can be made large and is an external device, it is effective from the standpoints of placement and maintenance.

The manufacturing apparatus will be specifically described below with reference to an embodiment shown in an accompanying drawing.

FIG. 1 shows a schematic view of the whole of a manufacturing apparatus to be used for suitably carrying out a method of controlling the temperature using an external circulation device according to the invention. In FIG. 1, 1 denotes a polymerizer; 2 denotes a heat exchanger for carrying out heating or cooling a polymerization reaction solution; and 3 denotes a circulation conduit extending from the bottom portion of the polymerizer 1 to the upper portion of the polymerizer 1 through the heat exchanger 2. Also, 4 denotes a circulation pump provided in the circulation conduit 3 between the polymerizer 1 and the heat exchanger 2. As the external circulation pump 4, a pump that hardly encloses air bubbles is preferable. This circulation pump 4 is provided with a flow control device (not shown) such as an inverter and a modulator and is capable of increasing the amount of the circulation liquid. Also, the amount of the circulation liquid can be measured by a volume flow meter 5. A conduit (not shown) for charging a raw material is provided in the upper portion of the polymerizer 1. Also, the polymerizer 1 is equipped with a jacket (not shown). A heating or cooling medium is supplied into the jacket through a conduit and the heat exchanger 2 through a conduit (not shown), respectively.

In such a manufacturing apparatus, a polymerization aqueous solution containing a monomer, an aqueous medium, a polymerization initiator, etc. as charged in the polymerizer 1 is discharged from the polymerizer 1 by the action of the circulation pump 4; reaches the heat exchanger 2 through the circulation conduit 3 and is cooled therein; and is then returned into the gas phase portion in the polymerizer 1 again through the circulation conduit 3. Since a discharge port of the liquid from the polymerizer 1 to the external circulation device is most applied with pressure and hardly bites air bubbles, it is preferably positioned in the lower portion of the polymerizer 1.

Using such a manufacturing apparatus, solution polymerization is carried out while circulating the polymerization aqueous solution using the external circulation device.

In the invention, the flow rate of the solution of the external circulation device is preferably from 0.01 to 15% by volume, more preferably from 0.1 to 10% by volume, further preferably from 1 to 8% by volume, and especially preferably from 2 to 5% by volume of the total charge amount of the polymer solution per minute. When the flow rate of the solution of the external circulation device is less than 0.01% by volume of the total charge amount of the polymer solution per minute, the time when the reaction solution is present outside is too long, whereas when it exceeds 15% by volume, the amount of the monomer to be carried outside prior to polymerization is large. Accordingly, in both of the cases, the polymer may possibly have an excessively high molecular weight or cause gelation, and hence, such is not preferable.

Also, the solution holding amount of the external circulation device is preferably from 1 to 30% by volume, and more preferably from 5 to 20% by volume of the total charge amount of the polymer solution. The total charge amount of the polymer solution as referred to herein is expressed using the volume to be used from a specific gravity of the solution at 25° C. (measured using a specific gravity hydrometer). Also, the solution holding amount of the external circulation device means a total volume including from the conduits of the external circulation device to the heat exchanger and so on. When the solution holding amount of the external circulation device is less than 1% by volume of the total charge amount of the polymer solution, it is required that cooling is extremely carried out in the outside for the sake of controlling the temperature, and when it exceeds 30% by volume, in particular, almost all of the liquid is carried outside at the initial stage of polymerization. Accordingly, in both of the cases, the polymer may possibly have an excessively high molecular weigh or cause gelation, and hence, such is not preferable. Also, it is preferable that the solution holding amount of the external circulation device is from 1 to 60% by volume of the initial liquid amount (the amount of the liquid already charged in the reactor prior to starting to add an initiator).

Further, in the invention, it is preferable that the temperature at an outlet of the external circulation device or at an introduction port to the polymerization reactor is from 10 to 90° C. In this way, it is possible to stably carry out heat removal. This temperature can be controlled by properly setting up the flow rate of the solution in the external circulation device and the temperature of a cooling medium.

In the method the invention, the circulation amount of the polymerization solution may be made at a fixed level or may be changed continuously or stepwise with the progress of polymerization.

As the polymerizer 1 in the polymerization apparatus of the invention, the conventionally known modes equipped with a stirrer, a jacket, etc. are employed.

As the heat exchanger 2, generally employed heat exchangers such as a multipipe heat exchanger, a coil type heat exchanger, a spiral heat exchanger, and a trombone cooler can be applied. As heating or cooling media, steam, cooling water, brine, etc. can be used. Also, an efficiency of heat removal may be enhanced by constructing the circulation conduit 3 itself in a double tube structure and passing cooling water or brine through an external space.

In the manufacturing apparatus for carrying out the method of the invention, it is preferable that portions with which the reaction mixture comes into contact, such as the heat exchanger 2, the circulation conduit 3, the circulation pump 4, and other valves are made of SUS, specifically SUS304, SUS316, SUS316L, etc. from the standpoints of heat conduction and corrosion resistance. Also, the conventionally known scale preventives may be coated on these portions, or such scale preventives may be added to the aqueous suspension mixture.

Next, a method of controlling the temperature using an internal coil device will be described below. By controlling the temperature by providing an internal coil device having heat exchanging function in a polymerizer, polymerization can be carried out with good efficiency. Such a method will be described below with reference to FIG. 2.

Figure 2:
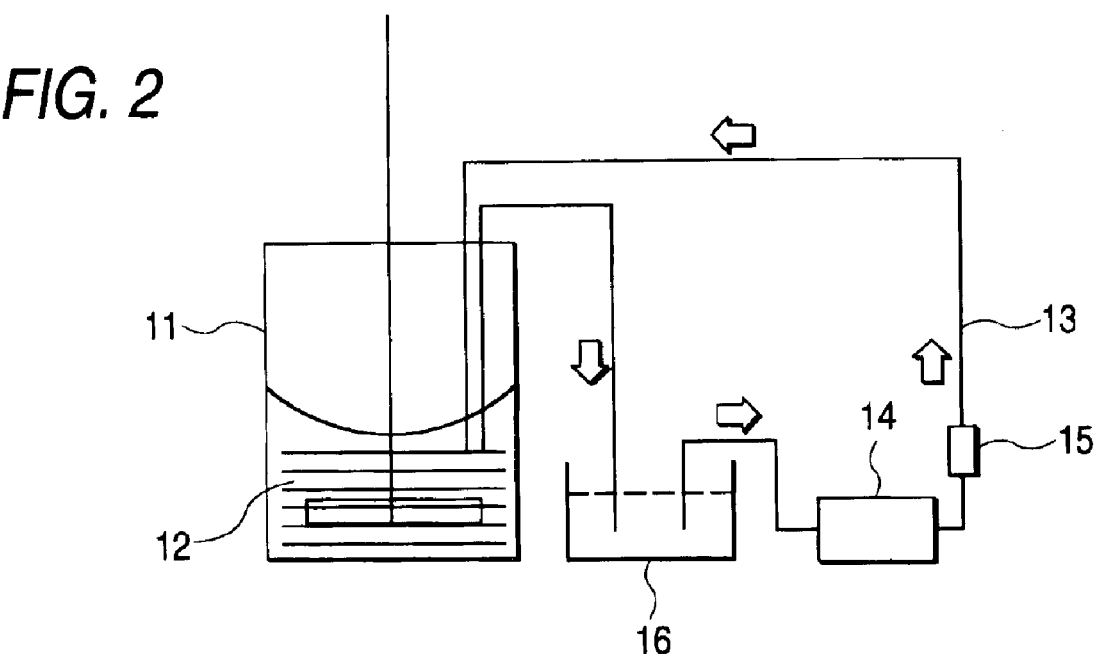
FIG. 2 is a schematic view to show an example of a polymerization apparatus for suitably carrying out the production process using an internal coil device according to the invention.

FIG. 2 shows a schematic view of the whole of a manufacturing apparatus to be used for suitably carrying out a method of controlling the temperature using an internal coil device according to the invention. In FIG. 1, 11 denotes a polymerizer; 12 denotes an internal coil for heating or cooling a polymerization reaction solution; and 13 denotes a circulation conduit extending from the bottom portion of the internal coil 12 to the upper portion of the internal coil 12 through a temperature controller 16. Also, 14 denotes a circulation pump provided in the circulation conduit 13 between the internal coil 12 and the temperature controller 16. This circulation pump 14 is equipped with a flow control device (not shown) such as an inverter and a modulator and is capable of increasing the amount of the circulation liquid. Also, the amount of the circulation liquid can be measured by a volume flow meter 15. A conduit (not shown) for charging a raw material is provided in the upper portion of the polymerizer 11. Also, the polymerizer 11 is equipped with a jacket (not shown). A heating or cooling medium is supplied into the jacket through a conduit.

The internal coil 12 has heat exchanging function. The heating or cooling medium within the internal coil 12 is discharged from the bottom portion of the polymerizer 11 by the action of the circulation pump 14; reaches the temperature controller 16 through the circulation conduit 13 and is cooled or heated therein; and is then returned into the internal coil 12 within the polymerizer 11 again through the circulation conduit 13. Using such a manufacturing apparatus, solution polymerization is carried out while controlling the temperature of the polymerization aqueous solution within the polymerizer 11.

In order that the temperature of the medium within the internal coil 12 may efficiently control the liquid temperature, it is preferably from 0° C. to 90° C.

The method of the invention is useful in aqueous solution polymerization using a (meth)acrylic acid based monomer, especially aqueous solution polymerization of a (meth) acrylic acid system using a bisulfite or hydrogen peroxide water as a polymerization initiator because a generated gas (such as sulfurous acid gas) can be efficiently utilized. By using the method of the invention, a (meth)acrylic acid based polymer which is a low-molecular weight water-soluble polymer having excellent dispersion ability, chelating ability and gelation resistance can be easily obtained. That is, by applying the temperature control method of the invention, not only sulfurous acid gas to be exhausted is reduced, but also the amount of a polymerization initiator is reduced (preferably, a degree of neutralization during the polymerization is also reduced), whereby impurities can be reduced. In this way, the performance which the (meth) acrylic acid based polymer has can be markedly improved, a lowering in the performance and deposition of impurities at the time of low-temperature storage can be reduced, and the high performance that is imparted at the manufacturing stage can be always stably kept without being influenced by the storage surroundings (that is, the performance as originally possessed can be sufficiently revealed without reduction).

The (meth)acrylic acid (salt) based polymer as referred to in the invention means that the carboxyl group of a (meth) acrylic acid based polymer may be any of an acid type, a partial salt type, a complete salt type, or a mixed type thereof Such partial salt type and complete salt type will be simply referred to as "(salt)", hereinafter. Examples of salts include salts of an alkali metal such as sodium and potassium; salts of an alkaline earth metal such as calcium and magnesium; ammonium salts; and salts of an organic amine such as monoethanolamine and triethanolamine. These salts may be used singly or in admixture of two or more thereof. The salt form is preferably a salt of an alkali metal such as sodium and potassium, and especially preferably a sodium salt.

As the monomer that is used in producing a (meth)acrylic acid based polymer, ones comprising a monomer component capable of producing a (meth)acrylic acid based polymer can be used without particular limitations. Monomers containing at least (meth)acrylic acid (salt) (may be referred to as "monomer (I)", hereinafter) may be used. If desired, a water-soluble monoethylenically unsaturated monomer copolymerizable with (meth)acrylic acid (salt) (may be referred to as "monomer (II)", hereinafter) and/or other monomer (may be referred to as "monomer (III)", hereinafter) may be contained. The monomer as referred to herein means one constituted of a monomer component but doses not include other components to be used in the polymerization, such as a solvent, an initiator, and other additives.

Examples of the foregoing monomer (I) component include acrylic acid (salt) and methacrylic acid (salt). Specific examples of the acrylic acid salt and methacrylic acid salt include salts of (meth)acrylic acid partially neutralized or completely neutralized with an alkali metal such as sodium and potassium; salts of (meth)acrylic acid partially neutralized or completely neutralized with ammonia or an organic amine such as monoethanolamine and triethanolamine; monoethylenically unsaturated aliphatic monocarboxylic acids such as crotonic acid and α-hydroxyacrylic acid; salts of the foregoing monoethylenically unsaturated aliphatic monocarboxylic acids partially neutralized or completely neutralized with an alkali metal; and salts of the foregoing monoethylenically unsaturated aliphatic monocarboxylic acids partially neutralized or completely neutralized with ammonia or an organic amine such as monoethanolamine and triethanolamine. These monomer (I) components may be used singly or in admixture of two or more thereof. It is preferable to use acrylic acid (salt) alone or a mixture comprising acrylic acid (salt) and methacrylic acid (salt) in a prescribed mixing ratio.

The amount of the monomer (I) to be compounded is in the range of from 50 to 100% by mole, preferably from 70 to 100% by mole, and more preferably from 90 to 100% by mole based on the whole amount of the monomers. When the compounding amount of the monomer (I) is 50% by mole or more, it is possible to reveal chelating ability and gelation resistance with a good balance, and hence, such is preferable. On the other hand, the upper limit of the compounding amount of the monomer (I) may be 100% by mole, that is, the whole is constituted of (meth)acrylic acid (salt). Further, in the case where a combination of acrylic acid (salt) and methacrylic acid (salt) is employed as the monomer (I), the methacrylic acid (salt) is preferably used in a compounding amount in the range of not more than 50% by mole, more preferably from 0.5 to 40% by mole, and further preferably from 1 to 30% by mole based on the whole amount of the monomers. When the compounding amount of the methacrylic acid (salt) falls within the foregoing range, especially preferred chelating ability can be obtained.

Incidentally, the monomer (I) may be added in the state of a solution (preferably an aqueous solution) of the monomer (I) dissolved in a solvent as described later, and preferably water. In the case where the monomer (I) is used as a solution (preferably an aqueous solution) thereof, the concentration of the monomer (I) is from 30 to 70% by weight, preferably from 35 to 65% by weight, and more preferably from 40 to 60% by weight. When the concentration of the monomer (I) in the solution falls within the foregoing range, products having a good concentration can be obtained, and hence, such is preferable from the standpoints of transport and storage.

Also, the water-soluble monoethylenically unsaturated monomer component copolymerizable with (meth)acrylic acid as the foregoing monomer (II) is not particularly limited. Specific examples include monoethylenically unsaturated aliphatic dicarboxylic acids such as maleic acid, fumaric acid, and itaconic acid; salts of foregoing monoethylenically unsaturated aliphatic dicarboxylic acids partially neutralized or completely neutralized with an alkali metal; salts of foregoing monoethylenically unsaturated aliphatic dicarboxylic acids partially neutralized or completely neutralized with ammonia or an organic amine such as monoethanolamine and triethanolamine; sulfonic acid group-containing monoethylenically unsaturated monomers such as vinylsulfonic acid, allylsulfonic acid, and 3-allyloxy-2-hydroxypropanesulfonic acid; salts of the foregoing monoethylenically unsaturated monomers partially neutralized or completely neutralized with an alkali metal; salts of the foregoing monoethylenically unsaturated monomers partially neutralized or completely neutralized with ammonia or an organic amine such as monoethanolamine and triethanolamine; hydroxyl group-containing unsaturated hydrocarbons such as 3-methyl-2-buten-1-ol (may be simply referred to as "prenol"), 3-methyl-3-buten-1-ol (may be simply referred to as "isoprenol"), and allyl alcohol; and unsaturated polyalkylene glycol based monomers having an alkylene oxide added to isoprenol or allyl alcohol.

As the monomer (II), one or two or more kinds of the foregoing compounds can be properly selected and used, if desired. Also, among the foregoing compounds, it is preferable to use one or two ore more compounds selected from unsaturated aliphatic dicarboxylic acids, sulfonic acid group-containing unsaturated hydrocarbons, and partially or completely neutralized salts thereof because these compounds are especially excellent in chelating ability, dispersion ability and gelation resistance.

The amount of the monomer (II) to be compounded is from 0 to 50% by mole, preferably from 0 to 30% by mole, and more preferably from 0 to 10% by mole based on the whole amount of the monomers. When the compounding amount of the monomer (II) is not more than 50% by mole, good chelating ability is revealed. On the other hand, since the monomer (II) is an optional component, the lower limit of the compounding amount thereof is 0% by mole. That is, any of a homopolymer or copolymer made of the foregoing monomer (I) may be employed.

The monomer (II) may be added in the state of a solution (preferably an aqueous solution) of the monomer (II) dissolved in a solvent as described later, and preferably water. In the case where the monomer (II) is used as a solution (preferably an aqueous solution) thereof, the concentration of the monomer (II) is from 10 to 100% by weight, preferably from 20 to 95% by weight, and more preferably from 30 to 90% by weight. When the concentration of the monomer (II) in the solution is 10% by weight or more, products having a good concentration can be obtained, and hence, such is preferable from the standpoints of transport and storage. On the other hand, the upper limit of the concentration of the monomer (II) in the solution should not be particularly limited but may be 100% by weight (i.e., the whole is constituted of the monomer (II)) (i.e., solvent-free).

Besides the foregoing monomers (I) and (II), the monomer (III) may be used in combination. The monomer (III) is not particularly limited, but hydrophobic monomers such as vinyl acetate, vinylpyrrolidone, vinyl ethers, styrene, and (meth)acrylic acid esters such as methyl (meth)acrylate and ethyl (meth)acrylate can be used. The monomer (III) can be properly selected and used singly or in admixture of two or more thereof, if desired. When a hydrophobic monomer is used as the monomer (III), though the hydrophobic compound is excellent in dispersibility, gelation resistance of the resulting (meth)acrylic acid based polymer may possibly be deteriorated. Accordingly, its compounding amount must be restricted depending upon the use application.

In the case where a hydrophobic monomer is compounded as the monomer (III), the compounding amount of the monomer (III) is preferably within the range of less than 40% by mole, more preferably from 0 to 20% by mole, and further preferably from 0 to 10% by mole based on the whole amount of the monomers. In other words, the compounding amount of a hydrophilic monomer as the sum of the monomer (I) and the monomer (II) (i.e., a hydrophilic monomer containing 50% by mole or more of (meth)acrylic acid) is preferably in the range of 60% by mole or more, more preferably from 80 to 100% by mole, and further preferably from 90 to 100% by mole. In the case where the compounding amount of the hydrophobic monomer as the monomer (III) is 40% by mole or more (i.e., the case where the compounding amount of the hydrophilic monomer as the sum of the monomer (I) and the monomer (II) is less than 60% by mole), as described in U.S. Pat. No. 3,646,099, the resulting low-molecular weight polymer may not become water-soluble, and hence, such is not preferable. Also, a Q value of the gelation resistant ability of the resulting (meth) acrylic acid based polymer may possibly become large, and a (meth)acrylic acid based polymer having excellent gelation resistance may not possibly be obtained.

The monomer (III) may be added in the state of a solution of the monomer (III) dissolved in a solvent (preferably containing an organic solvent) as described later. In the case where the monomer (III) is used as a solution thereof, the concentration of the monomer (III) is from 10 to 100% by weight, preferably from 20 to 95% by weight, and more preferably from 30 to 90% by weight. When the concentration of the monomer (III) in the solution is 10% by weight or more, products having a good concentration can be obtained, and hence, such is preferable from the standpoints of transport and storage. On the other hand, the upper limit of the concentration of the monomer (III) in the solution should not be particularly limited but may be 100% by weight (i.e., the whole is constituted of the monomer (III)) (i.e., solvent-free).

In the method of the invention, the foregoing monomer is polymerized in an aqueous solution. The aqueous solution contains a solvent, an initiator, and other additives. As other solvent that is used in the polymerization reaction system in polymerizing the foregoing monomer(s) in an aqueous solution, aqueous solvents such as alcohols, glycols, glycerin, and polyethylene glycols are preferable. One or more of these solvents can be used in combination with water. Also, for the sake of enhancing the solubility of the monomer(s) in a solvent, other organic solvents may be properly added within the range wherein polymerization of each monomer is not adversely affected. Specific examples of organic solvents include lower alcohols such as methanol and ethanol; amides such as dimethylformamide; and ethers such as diethyl ether and dioxane. One or more of these organic solvents can be properly selected and used.

The amount of the solvent to be used is in the range of from 40 to 200% by weight, preferably from 45 to 180% by weight, and more preferably from 50 to 150% by weight based on the whole amount of the monomers. When the amount of the solvent to be used is less than 40% by weight, the molecular weight becomes high. On the other hand, when the amount of the solvent to be used exceeds 200% by weight, the concentration of the produced (meth)acrylic acid based polymer becomes low so that removal of the solvent may possibly become necessary, and hence, such is not preferable. Incidentally, a part of the solvent may be charged in a reactor at the initial stage of the polymerization. A part of the solvent may be suitably added (dropped) singly in the reaction system during the polymerization. Alternatively, the solvent may be suitably added (dropped) together with the monomer component, the initiator component, and other additives in the state of a solution prepared by previously dissolving them therein.

Examples of initiators that are used in the polymerization reaction system in polymerizing the foregoing monomer(s) in an aqueous solution include persulfate and sulfite based initiators, persulfate and hydrogen peroxide water based initiators, sulfite and oxygen based initiators, iron and hydrogen peroxide based initiators, and persulfate based initiators. Of these, persulfate and sulfite based initiators and persulfate and hydrogen peroxide water based initiators are preferable. Also, multivalent metal ions (specifically, compounds enumerated in heavy metal-containing compounds as described later, for example, water-soluble multivalent metal salts such as vanadium oxytrichloride, multivalent metal oxides such as vanadium pentoxide, multivalent metal sulfides such as iron(III) sulfide, and single metals such as copper powders; above all, ammonium iron sulfate (Mohr's salt)) may be used jointly.

In particular, by using one or more of a persulfate and one or more of a bisulfite in combination, it is possible to obtain a low-molecular weight water-soluble polymer having excellent gelation resistance in addition to dispersion ability and chelating ability, and hence, such is preferable. When in addition to the persulfate, the bisulfite is added to the initiator system, what the resulting polymer has an excessively high molecular weight is suppressed, whereby a polymer having a low molecular weight can be efficiently produced.

Specific examples of the persulfate include sodium persulfate, potassium persulfate, and ammonium persulfate. Also, specific examples of the bisulfite include sodium bisulfite, potassium bisulfite, and ammonium bisulfite. Further, sulfites, pyrosulfites, etc. may be used in place of the bisulfite.

The addition ratio of the bisulfite to the persulfate is in the range of from 0.5 to 5 parts by weight, preferably from 1 to 4 parts by weight, and more preferably from 2 to 3 parts by weight per part by weight of the persulfate. When the bisulfite to be added is used in an amount of 0.5 parts by weight or more per part by weight of the persulfate, not only the sufficient effect due to the bisulfite can be obtained, but also the weight average molecular weight of the (meth)acrylic acid based polymer can be sufficiently suppressed to a low level. On the other hand, by controlling the addition amount of the bisulfite to not more than 5 parts by weight per part by weight of the persulfate, not only the sufficient addition effect by the bisulfite can be obtained, but also excessive feed of the bisulfite can be suppressed. For those reasons, it is possible to suppress generation of sulfurous acid gas caused due to decomposition of the excessive bisulfite in the polymerization reaction system. Also, it is possible to effectively prevent a lowering in the performance of the resulting (meth)acrylic acid based polymer and deposition of impurities at the time of storage at low temperatures, and hence, such is preferable.

With respect to the addition amount of the persulfate and bisulfite as the initiator, the total sum of the persulfate and bisulfite as the initiator is preferably from 2 to 20 g, more preferably from 4 to 15 g, further preferably from 6 to 12 g, and especially preferably from 6 to 9 g per mole of the monomer. In the invention, even by adding the persulfate and bisulfite in the range of such a low addition amount, generation of impurities can be markedly reduced. Also, since the polymerization temperature is controlled to a low level, generation of sulfurous acid gas during the manufacturing step can be markedly reduced. Further, it is possible to effectively prevent a lowering in the performance of the resulting (meth)acrylic acid based polymer and deposition of impurities at the time of storage at low temperatures. When the addition amount of the persulfate and bisulfite as the initiator falls within the range of from 2 to 20 g, a polymer having a good molecular weight can be efficiently obtained without causing adverse influences such as a lowering in the purity of the resulting (meth)acrylic acid based polymer.

The foregoing persulfate as one kind of the initiator may be added in the state of a solution of the persulfate dissolved in the foregoing aqueous solvent (preferably an aqueous solution). In the case where the persulfate is used as a solution (preferably an aqueous solution) thereof, the concentration of the persulfate is from 1 to 35% by weight, preferably from 5 to 35% by weight, and more preferably from 10 to 30% by weight. In the case where the concentration of the persulfate in the solution is less than 1% by weight, the concentration of a product lowers so that transport and storage become complicated. On the other hand, in the case where the concentration of the persulfate in the solution exceeds 35% by weight, deposition of the persulfate may possibly occur.

The bisulfite as another kind of the initiator may be added in the state of a solution of the bisulfite dissolved in the foregoing aqueous solvent (preferably an aqueous solution). In the case where the bisulfite is used as a solution (preferably an aqueous solution) thereof, the concentration of the bisulfite is from 10 to 40% by weight, preferably from 20 to 40% by weight, and more preferably from 30 to 40% by weight. When the concentration of the bisulfite in the solution falls within the foregoing range, products having a sufficient concentration can be obtained without possibility of occurrence of deposition of the bisulfite so that they are preferable from the standpoints of transport and storage.

Also, in the invention, it is preferable to use one or two or more persulfates in combination with hydrogen peroxide as the polymerization initiator. Also, as the case may be, a chain transfer agent or a multivalent metal ion may be used (here, the multivalent metal ion serves as a decomposition accelerator of the initiator), and the both may be used at the same time.

Details will be described below.

Specific examples of the persulfate include sodium persulfate, potassium persulfate, and ammonium persulfate. Of these, sodium persulfate is preferable.

The addition amount of the foregoing hydrogen peroxide is preferably from 2.0 to 10.0 g, and more preferably from 3.0 to 8.0 g per mole of the monomer. When the addition amount of hydrogen peroxide is 2.0 g or more, it is possible to obtain a (meth)acrylic acid (salt) based polymer having a sufficiently low weight average molecular weight. Also, when the addition amount of hydrogen peroxide is not more than 10.0 g, the sufficiently effective effect of hydrogen peroxide can be obtained without causing adverse influences due to residual hydrogen peroxide.

The addition amount of the foregoing persulfate is preferably from 1.0 to 5.0 g, and preferably from 2.0 to 4.0 g per mole of the monomer. When the addition amount of the persulfate is 1.0 g or more, it is possible to obtain a (meth)acrylic acid (salt) based polymer having a sufficiently low weight average molecular weight. Also, when the addition amount of the persulfate is not more than 5.0 g, the sufficiently effective effect of the persulfate can be obtained without causing a lowering in the purity of the resulting (meth)acrylic acid (salt) based polymer.

The weight ratio of the persulfate to the hydrogen peroxide to be added is from 0.1/1 to 5.0/1, and preferably from 0.5/1 to 3.0/1. When the weight ratio of the persulfate to the hydrogen peroxide is 0.1/1 or more, it is possible to control the weight average molecular weight of the resulting (meth) acrylic acid (salt) based polymer to a sufficiently low level. Also, when the weight ratio of the persulfate to the persulfate is not more than 5.0/1, the sufficiently effective effect of the persulfate can be obtained.

The addition method of the persulfate is not particularly limited. Taking into consideration its decomposability, it is preferable to add the persulfate to be substantially continuously dropped in an amount of 50% by weight or more, and especially preferably 80% by weight or more of the whole of the necessary amount. Most preferably, the whole amount of the persulfate is dropped. Though the persulfate is dropped continuously, the dropping rate may be changed.

The invention never excludes an embodiment wherein other initiator (including a chain transfer agent) may further be used in combination. If desired, such other initiator may be properly used so far as the action and effect of the invention are not adversely affected. Further, in the invention, though the foregoing combination of the persulfate with the bisulfite is suitably used as the initiator system, it should not be construed that the invention is limited to this combination. Examples of other initiators (including chain transfer agents) include azo based compounds such as 2,2'-azobis-(2-aminodipropane) hydrochloride, 4,4'-azobis-4-cyanovaleric acid, azobisisobutyronitrile, and 2,2'-azobis (4-methoxy-2,4-dimethylvaleronitrile); organic peroxides such as benzoyl peroxide, lauroyl peroxide, peracetic acid, di-t-butyl peroxide, and cumene hydroperoxide; and hydrogen peroxide.

These initiators may be added in the state of an aqueous solution dissolved in the foregoing aqueous solvent. In the case of the aqueous solution, the concentration of the initiator in the solution may be in the range wherein the effect of the invention is not hindered. Usually, the concentration is properly determined based on the same level as the concentration of the foregoing persulfate or bisulfite in the solution.

As other additives than the initiator that can be used in the polymerization reaction system in polymerizing the foregoing monomer in the aqueous solution, proper additives can be added in proper amounts so far as the action and effect of the invention are not influenced. For example, heavy metal-containing compounds and metal salts of organic peroxide or $H_2O_2$ may be added.

The heavy metal-containing compounds should not be particularly limited, but multivalent metal compounds or single metals can be employed. Specific examples include water-soluble multivalent metal salts such as vanadium oxytrichloride, vanadium trichloride, vanadyl oxalate, vanadyl sulfate, vanadic anhydride, ammonium m-vanadate, ammonium sulfate hypovanadous [(NH$_4$)$_2$SO$_4$.VSO$_4$.6H$_2$O], ammonium sulfate vanadous [(NH$_4$)V(SO$_4$)$_2$.12H$_2$O], copper(II) acetate, copper(II) bromide, copper(II) acetylacetate, ammonium cupric chloride, ammonium copper chloride, copper carbonate, copper(II) chloride, copper(II) citrate, copper(II) formate, copper(II) hydroxide, copper nitrate, copper naphthenate, copper(II) oleate, copper maleate, copper phosphate, copper(I) sulfate, cuprous chloride, copper(I) cyanide, copper iodide, copper(I) oxide, copper thiocyanate, acetylacetonateiron, ammonium iron citrate, ammonium ferric oxalate, ammonium iron sulfate, ammonium ferric sulfate, iron citrate, iron fumarate, iron maleate, ferruous lactate, ferric nitrate, pentacarbonyliron, ferric phosphate, and ferric pyrophosphate; multivalent metal oxides such as vanadium pentoxide, copper(II) oxide, ferrous oxide, and ferric oxide; multivalent metal sulfides such as iron(III) sulfide, iron(II) sulfide, and copper sulfide; copper powder; and iron powder.

Since that the concentration of the heavy metal ion in the resulting (meth)acrylic acid based polymer is desirably from 0.05 to 10 ppm, it is desirable to add a proper amount of the foregoing heavy metal-containing compound, if desired. In addition, the present inventors have found that in the case of using a vessel or agitator made of SUS (stainless steel), a proper amount of the heavy metal ion as defined previously, especially an iron ion elutes (feeds) into the reaction solution from SUS as the material of the vessel or the like under the manufacturing conditions according to the invention. This is advantageous from the cost-effective standpoint. In the production process of the invention, in the case of employing such a reaction device as an SUS-made reactor or agitator, the same action and effect as in the case of adding the foregoing heavy metal-containing compound can be brought. Incidentally, though there are no problems even in existent steel- or copper alloy-made reactors, the heavy metal ions may possibly elute in high concentrations. In such case, since the color of the heavy metal is visualized, an operation of removing such heavy metal ions becomes necessary, and hence, such is not economical. Also, there are no problems even in a glass-lined reactor, and a heavy metal-containing compound may be used as the need arises.

The polymerization temperature in polymerizing the monomer is usually from 25 to 99° C. The polymerization temperature is preferably 50° C. or higher, and more preferably 70° C. or higher. Also, the polymerization temperature is preferably not higher than 98° C., and more preferably not higher than 95° C. Further, the polymerization may be carried out at a temperature of lower than 90° C. When the polymerization temperature falls within the range of from 25 to 99° C., sufficient productivity can be achieved for a suitable polymerization time without causing a rise of the molecular weight, an increase of impurities, etc. Incidentally, the case where the polymerization temperature is the boiling point is not preferable because there give rise to adverse influences that (i) since the bisulfite as the initiator is decomposed to generate a large amount of sulfurous acid gas, the sulfurous acid gas is dissolved in the liquid phase after the polymerization to form impurities; (ii) sulfurous acid gas is exhausted out the system during the polymerization, whereby costs for recovery are necessary; and (iii) since the bisulfite as the initiator is taken out as sulfurous acid gas, a sufficient effect in proportion to the addition is not obtained, and the molecular weight does not decrease. Incidentally, the polymerization temperature as referred to herein means the temperature of the reaction solution within the reaction system.

It is not required that the polymerization temperature be always kept at a substantially fixed level during the polymerization. For example, there may be employed a method in which the polymerization is started at room temperature (the temperature of lower than 25° C. may be employed, that is, the polymerization temperature may be temporarily out of the foregoing preferred polymerization temperature range), the temperature rises to an established temperature for a proper temperature rise time (or at a temperature rise rate), and the established temperature is then kept. Alternatively, the dropping time may be changed according to every component to be dropped such as the monomer and initiator. The temperature may be changed (increased or decreased) with time within the foregoing temperature range on the way of the polymerization depending upon the dropping manner. There are no particular limitations so far as the action and effect of the invention are not hindered.

In particular, in the case of a method of starting the polymerization from room temperature (room temperature start method), for example, according to the formulation of 300 minutes, the temperature may be raised to an established value (the temperature may be within the polymerization temperature range as defined previously, but is preferably from about 70 to 90° C., and more preferably from about 80 to 90° C.) for a period of time of within 120 minutes, preferably from 0 to 90 minutes, and more preferably from 0 to 60 minutes. Thereafter, it is desired to maintain the established temperature until completion of the polymerization. In the case where the temperature rise time is out of the foregoing range, the resulting (meth)acrylic acid based polymer may possibly have a high molecular weight. Incidentally, while an example of the polymerization time of 300 minutes has been described, in the case where the formulation of polymerization time is different, it is desired to set up the temperature rise time such that the ratio of the temperature rise time to the polymerization time is the same while referring to this example.

In polymerizing the foregoing monomer, the pressure in the reaction system is not particularly limited. The pressure may be any of atmospheric pressure, reduced pressure, or elevated pressure. For the sake of preventing release of sulfurous acid gas during the polymerization and realizing a low molecular weight, it is preferable to carry out the polymerization at atmospheric pressure or under an elevated pressure by sealing the reaction system. Also, when the polymerization is carried out at atmospheric pressure, it is not required to establish a pressurizing device or vacuum device in parallel, and it is not required to use a pressure-resistant reactor or pipe. Thus, it is preferable to carry out the polymerization at atmospheric pressure from the viewpoint of the manufacturing costs. That is, the optimal pressure condition may be properly established according to the use purpose of the resulting (meth)acrylic acid based polymer.

The atmosphere in the reaction system may be the air atmosphere or inert atmosphere. For example, the inside of the system prior to start of the polymerization may be displaced by an inert gas. Thus, the atmospheric gas (for example, oxygen gas) in the reaction system is dissolved in the liquid phase and serves as a polymerization inhibitor. As a result, the persulfate as the initiator is prevented from inactivation and reduction, thereby possibly enabling the resulting (meth)acrylic acid based polymer to realize a lower molecular weight.

In the production process of the invention, it is preferable to carry out the polymerization reaction of the monomer under an acidic condition. When the polymerization reaction is carried out under an acidic condition, it is possible to suppress a rise of the viscosity of an aqueous solution of the polymerization reaction system and to well produce a (meth) acrylic acid based polymer having a low molecular weight. Moreover, since the polymerization reaction can be advanced under a condition of higher concentration than the conventional technologies, the manufacturing efficiency can be largely increased. In particular, by establishing the degree of neutralization during the polymerization at a low level of from 1 to 25% by mole, the effect due to a reduction of the amount of the initiator can be synergistically enhanced, and a reducing effect of impurities can be markedly improved. Further, it is desired to adjust the reaction solution during the polymerization so as to have a pH of from 1 to 6 at 25° C. By carrying out the polymerization reaction under such an acidic condition, it is possible to carry out the polymerization at one stage in a high concentration. For those reasons, it is also possible to omit a concentration step optionally necessary in the conventional production processes. Therefore, productivity of the (meth)acrylic acid based polymer is greatly improved so that an increase of the manufacturing costs may be controlled.

With respect to the foregoing acidic condition, the pH of the reaction solution during the polymerization at 25° C. is from 1 to 6, preferably from 1 to 5, and more preferably from 1 to 4. When the pH is in the range of from 1 to 6, neither generation of sulfurous acid gas nor corrosion of the device occurs, the efficiency of the bisulfite is not lowered, and it is possible to control the resulting polymer so as to have a low molecular weight. Therefore, such is preferable.

Examples of pH adjustors that are used for adjusting the pH of the reaction solution during the polymerization include alkali metal hydroxides such as sodium hydroxide and potassium hydroxide; alkaline earth metal hydroxides such as calcium hydroxide and magnesium hydroxide; ammonia; and organic amines such as monoethanolamine and triethanolamine. These compounds may be used singly or in admixture of two or more thereof. Of these, alkali metal hydroxides such as sodium hydroxide and potassium hydroxide are preferable, and sodium hydroxide is especially preferable. In the present specification, these compounds may be simply referred to as "pH adjustor" or "neutralizing agent".

The degree of neutralization during the polymerization is from 1 to 25% by mole. In the case where the monomer to be used in the polymerization consists of only the monomer (I), the degree of neutralization is preferably in the range of from 2 to 15% by mole, and more preferably from 3 to 10% by mole. In the case where the monomer to be used in the polymerization contains the monomer (II) in addition to the monomer (I), though a part or the whole of the monomer (II) can be charged at the initial stage, at this time the degree of neutralization is preferably in the range of from 1 to 25% by mole, and more preferably from 3 to 10% by mole. When the degree of neutralization during the polymerization falls within the foregoing range, even in the case where only the monomer (I) is used for polymerization or the monomer (I) and the monomer (II) are copolymerized, it is possible to undergo polymerization or copolymerization in the optimal manner. Also, a polymer having a low molecular weight can be produced without causing an increase in the viscosity of the aqueous solution of the polymerization reaction system. Moreover, since the polymerization reaction can be advanced under a condition of a higher concentration than that in the conventional technologies, the manufacturing efficiency can be largely increased. When the degree of neutralization during the polymerization is 1% by mole or more, the generation of sulfurous acid gas can be well suppressed, and the molecular weight of the resulting polymer can be controlled at a sufficiently low level. Therefore, such is preferable. Also, when the degree of neutralization during the polymerization is not more than 25% by mole, since it is possible to obtain a sufficient chain transfer efficiency of the bisulfite, the molecular weight of the resulting polymer can be controlled at a sufficiently low level. Also, the increase in the viscosity of the aqueous solution of the polymerization reaction system with the advance of polymerization can be suppressed, and a polymer having a low molecular weight can be obtained without causing an excessive increase of the molecular weight of the resulting polymer. Further, an effect due to a reduction in the degree of neutralization can be sufficiently revealed, whereby impurities can be reduced.

Here, the neutralization method is not particularly limited. As the neutralizing agent, for example, the alkaline monomer (I) component such as sodium (meth)acrylate may be employed. Alternatively, alkali metal hydroxides such as sodium hydroxide may be used. Also, these may be used in combination. With respect to the addition mode of the neutralizing agent in the neutralization, the neutralizing agent may be a solid or a solution thereof dissolved in an appropriate solvent, and preferably an aqueous solution thereof dissolved in water. In the case of using an aqueous solution, the concentration of the aqueous solution is preferably from 10 to 60% by weight, more preferably from 20 to 55% by weight, and further preferably from 30 to 50% by weight. When the concentration of the aqueous solution is 10% by weight or more, products having a good concentration can be obtained, and hence, such is preferable from the standpoints of transport and storage. On the other hand, when the concentration of the aqueous solution is not more than 60% by weight, neither deposition nor an increase in the viscosity occurs, and transport of liquid is easy. Therefore, such is preferable.

In the polymerization, the foregoing monomer, persulfate and bisulfite as the initiator system and other additives are each, in general, dissolved in an appropriate solvent (preferably the same solvent as the solvent to be dropped) in advance, to prepare a monomer solution, a persulfate solution and a bisulfite solution, and a solution of other additive. It is preferable that the respective solutions are continuously dropped to an (aqueous) solvent charged in a reactor (adjusted at a prescribed temperature, if desired) over a prescribed period of time of dropping, to undergo polymerization. Further, a part of the aqueous solvent may be dropped later separately from the initially charged solvent as charged in advance in the reactor in the reaction system. But, it should not be construed that the production process of the invention is limited thereto. For example, with respect to the dropping method, the solutions may be continuously dropped or dividedly dropped in an intermittent manner. A part or the whole of the monomer (II) may be charged at the initial stage (that is, it may be considered that the whole or a part of the monomer (II) is dropped at once at the time of polymerization). Also, with respect to the dropping rate (dropping amount) of the monomer (II), the monomer (II) may be dropped always at a fixed rate from start to completion of the dropping, or the dropping rate (dropping amount) of the monomer (II) may be changed with time depending upon the polymerization temperature and the like. Also, all of the dropping components are not dropped in the same way, but the time of start or completion of dropping may be changed according to each of the dropping components, or the dropping time may be shortened or prolonged. Thus, the production process of the invention can be changed within the range wherein the action and effect of the invention are not hindered. Also, in the case where each of the components is dropped in the state of a solution, the solution to be dropped may be heated to the same degree as the polymerization temperature in the reaction system. In this way, in the case where the polymerization temperature is kept at a fixed level, the temperature fluctuation is small, and the temperature adjustment is easy.

In the case where the monomers (I), (II) and/or (III) are copolymerized, the dropping time may be controlled according to the polymerizability of each monomer. For example, in the case where a monomer having low polymerizability is used, the dropping time may be shortened. Also, a part or the whole of the monomers may be charged in advance in the reactor in the reaction system.

In addition, in the bisulfite, the molecular weight at the initial stage of polymerization largely influences the final molecular weight. For that reason, for the sake of lowering the molecular weight at the initial stage, it is desirable to add (drop) the bisulfite or its solution in an amount of from 5 to 20% by weight within 60 minutes, preferably within 30 minutes, and more preferably within 10 minutes after start of the polymerization. Especially, such is effective in the case where the polymerization is started at room temperature.

Also, in the polymerization, it is more preferable that the polymerization temperature is lowered to suppress generation of sulfurous acid gas and to prevent formation of impurities. For that reason, it is preferable that the total dropping time during the polymerization is from 60 to 600 minutes, preferably from 90 to 480 minutes, and more preferably from 120 to 420 minutes. The total dropping time as referred to herein means a time of from start of dropping of the first dropping component (not limited to a single component) until completion of dropping of the last dropping component (not limited to a single component). Taking into consideration the foregoing problems occurred in the manufacturing step and the design to improve the performance of the resulting polymer, it can be said that to prolong the polymerization time is an extremely meaningful countermeasure. In the case where the total dropping time is shorter than 60 minutes, the effect due to the persulfate solution and bisulfite solution to be added as the initiator system is hardly achieved efficiently. As a result, the weight average molecular weight of the resulting polymer is liable to become high. Also, since the necessary components are dropped within a short period of time, the excessive initiator may possibly be present in the reaction system. For that reason, the excessive initiator is decomposed to general sulfurous acid gas, which is likely released out the system or may form impurities. However, by finding a technical meaning by carrying out the polymerization within the specific ranges of polymerization temperature and amount of initiator, it may be said that the problems as discussed previously in the conventional technologies are not caused. It may be said that this is also the same in the case of falling outside other various polymerization conditions. On the other hand, in the case where the total dropping time exceeds 600 minutes, since the generation of sulfurous acid gas is suppressed, the performance of the resulting polymer is good. However, productivity of the (meth)acrylic acid based polymer lowers, resulting in possibly limiting the use application. Therefore, such is not preferable.

Also, with respect to the dropping time of the bisulfite or its solution among the dropping components during the polymerization, it is preferable that the time of completion of the dropping of the bisulfite or its solution is made from 1 to 30 minutes, preferably from 1 to 20 minutes, and more preferably from 1 to 15 minutes faster than the time of completion of the dropping of the monomer (I) or its solution. In this way, the amount of the bisulfite after completion of the polymerization can be reduced, and generation of sulfurous acid gas or formation of impurities due to the bisulfite can be suppressed efficiently and effectively. For that reason, it is possible to markedly reduce impurities formed when after completion of the polymerization, the sulfurous acid gas in the gas phase is dissolved in the liquid phase. In the case where the bisulfite remains after completion of the polymerization, impurities are formed, leading to a lowering in the performance of the resulting polymer, or occurrence of deposition of impurities at the time of low-temperature storage is caused. Accordingly, it is desired that the initiator containing a bisulfite is consumed and does not remain after completion of the polymerization.

Here, in the case where the time of completion of dropping of the bisulfite (solution) cannot be shortened by one minute or longer as compared with the time of completion of dropping of the monomer (I) (solution), the bisulfite may possibly remain after completion of the polymerization. Such case includes the case where the completion of dropping of the bisulfite or its solution is simultaneous with the completion of dropping of the monomer (I) (solution) and the case where the completion of dropping of the bisulfite (solution) is later than the completion of dropping of the monomer (I) (solution). In these cases, it is difficult to suppress generation of sulfurous acid gas or formation of impurities efficiently and effectively so that the residual initiator may possibly adversely affect the heat stability of the resulting polymer. On the other hand, in the case where the time of completion of dropping of the bisulfite or its solution is faster by more than 30 minutes as compared with the time of completion of dropping of the monomer (I) (solution), the bisulfite is consumed prior to completion of the polymerization. For that reason, the molecular weight may possibly increase. Besides, during the polymerization, the dropping rate of the bisulfite is faster than the dropping rate of the monomer (I) (solution), and a large amount of the bisulfite is dropped within a short period of time, and therefore, large amounts of impurities and sulfurous acid gas may possibly be generated during the dropping period.

Also, in the polymerization, the time of completion of dropping of the persulfate (solution) among the dropping components is delayed by from 1 to 30 minutes, preferably from 1 to 20 minutes, and more preferably from 1 to 15 minutes as compared with the time of completion of dropping of the monomer (I) (solution). In this way, the amount of the residual monomer after completion of the polymerization can be reduced, and impurities caused by the residual monomer can be markedly reduced.

Here, in the case where the time of completion of dropping of the persulfate (solution) cannot be delayed by one minute or longer as compared with the time of completion of dropping of the monomer (I) (solution), the monomer component may possibly remain after completion of the polymerization. Such case includes the case where the completion of dropping of the persulfate (solution) is simultaneous with the completion of dropping of the monomer (I) (solution) and the case where the completion of dropping of the persulfate (solution) is faster than the completion of dropping of the monomer (I) (solution). In these cases, it is difficult to suppress generation of formation of impurities efficiently and effectively. On the other hand, in the case where the time of completion of dropping of the persulfate (solution) is delayed by more than 30 minutes as compared with the time of completion of dropping of the monomer (I)

(solution), the persulfate or its decomposition product remains after completion of the polymerization so that impurities may possibly be formed.

At the time when dropping of the respective components is completed, and the polymerization reaction in the polymerization reaction system is completed, the concentration of the solids content in the aqueous solution (i.e., the concentration of the polymeric solids content of the monomer) is 35% by weight or more, preferably from 40 to 70% by weight, and more preferably from 45 to 65% by weight. When the concentration of the solids content after completion of the polymerization reaction is 35% by weight or more, the polymerization can be carried out in a high concentration at one stage. For that reason, it is possible to efficiently obtain a (meth)acrylic acid based polymer having a low molecular weight. For example, it is possible to omit a concentration step optionally necessary in the conventional production processes. Therefore, the manufacturing efficiency can be largely increased. As a result, productivity of the (meth)acrylic acid based polymer is greatly improved so that an increase of the manufacturing costs may be controlled.

When the concentration of the solids content is less than 35% by weight, the productivity of the (meth)acrylic acid based polymer may not possibly be greatly improved. For example, it is difficult to omit the concentration step.

In the polymerization reaction system, when the concentration of the solids content is increased, the conventional technologies involved a problem such that the increase in the viscosity of the reaction solution with the advance of polymerization reaction becomes remarkable, whereby the weight average molecular weight of the resulting polymer greatly increases. However, when the polymerization reaction is carried out in the acidic side (the pH at 25° C. is from 1 to 6, and the degree of neutralization is in the range of from 1 to 25% by mole), it is possible to suppress the increase in the viscosity of the reaction solution with the advance of polymerization reaction. Therefore, even when the polymerization reaction is carried out under a condition of high concentration, a polymer having a low molecular weight can be obtained, and the manufacturing efficiency of the polymer can be greatly increased.

The time of completion of the polymerization reaction as referred to herein may be the time when dropping of all of the dropping components is completed, but preferably means the time when after completion of dropping, a prescribed ripening period elapses (the polymerization is completed).

The ripening time is usually from 1 to 120 minutes, preferably from 5 to 60 minutes, and more preferably from 10 to 30 minutes. In the case where the ripening time is shorter than 1 minute, the monomer component may possibly remain due to insufficient ripening, whereby impurities caused by the residual monomer are formed, resulting in lowering in the performance. On the other hand, in the case where the ripening time exceeds 120 minutes, the polymer solution may possibly be colored. Besides, the polymerization is already completed, and therefore, it is not economical to further apply a polymerization temperature.

Also, since the ripening is carried out within the polymerization reaction period and included during the polymerization, the foregoing polymerization temperature is applied thereto. Thus, the temperature as employed herein may be kept at a fixed temperature (preferably the temperature at the time of completion of dropping) or may be changed with time during the ripening. Accordingly, the polymerization time refers to the sum of the total dropping time and the ripening time and means the time required from the time of start of first dropping until the time of completion of the ripening.

Also, in the production process of the (meth)acrylic acid based polymer according to the invention, the polymerization is carried out under the foregoing acidic condition (the reaction solution during the polymerization has a pH of from 1 to 6 at 25° C., and the degree of neutralization during the polymerization is from 1 to 25% by mole). For that reason, the degree of neutralization (ultimate degree of neutralization) of the resulting (meth)acrylic acid based polymer can be set up at a prescribed range by properly adding an appropriate alkaline component as the post-treatment according to the need after completion of the polymerization.

Since the ultimate degree of neutralization varies depending upon the use application, it should not be particularly limited but can be set up over an extremely wide range of from 1 to 100% by mole. For example, in the case where the resulting (meth)acrylic acid based polymer is utilized as a detergent builder in weakly acidic detergents that are called mild to the bare skin, the resulting acidic (meth)acrylic acid based polymer may be used as it is without being neutralized. Also, in the case where the resulting (meth)acrylic acid based polymer is utilized in neutral detergents or alkaline detergents, it may be used after neutralizing it with an alkaline component as the post-treatment to an extent of a degree of neutralization of 90% by mole or more. In particular, in the case where the resulting (meth)acrylic acid based polymer is used as an acidic polymer, the ultimate degree of neutralization is preferably from 1 to 75% by mole, and more preferably from 5 to 70% by mole. In the case where the resulting (meth)acrylic acid based polymer is used as a neutral or alkaline polymer, the ultimate degree of neutralization is preferably from 75 to 100% by mole, and more preferably from 85 to 99% by mole. Also, in the case where the resulting (meth)acrylic acid based polymer is used as a neutral or alkaline polymer, when the ultimate degree of neutralization exceeds 99% by mole, the polymer aqueous solution may possibly be colored.

Examples of the foregoing alkaline component include those represented by alkali metal hydroxides such as sodium hydroxide and potassium hydroxide; alkaline earth metal hydroxides such as calcium hydroxide and magnesium hydroxide; ammonia; and organic amines such as monoethanolamine, diethanolamine, and triethanolamine. The alkaline component may be used singly or in admixture of two or more thereof Incidentally, it is also possible to set up the ultimate degree of neutralization by subjecting the (meth)acrylic acid salt based polymer obtained by the conventional complete neutralization mode or partial neutralization mode to desalting treatment. However, in this case, by adding the desalting step, the manufacturing step becomes complicated, and the manufacturing costs increases. For that reason, the use application may possibly be limited.

Also, in the case where the resulting acidic (meth)acrylic acid based polymer may be used as it is without being neutralized, since the reaction system is acidic, there is some possibility that noxious sulfurous acid gas ($SO_2$ gas) remains in the atmosphere in the reaction system. In such case, it is desired to decompose the sulfurous acid gas by adding peroxides such as hydrogen peroxide, or to turn the sulfurous acid gas out by introducing (blowing) air or nitrogen gas.

Also, the (meth)acrylic acid based polymer of the invention may be produced in a batch manner or in a continuous manner.

As described previously, in the production of a (meth)acrylic acid based polymer, it is preferable that in using one or more of the persulfate and one or more of the bisulfite as the initiator, the weight ratio of the bisulfite to the persulfate is in the range of from 0.5/1 to 5/1; the total sum of the persulfate and the bisulfite to be added in the polymerization reaction system is in the range of from 2 to 20 g per mole of the monomer per mole of the monomer; and the polymerization temperature is in the range of from 25 to 99° C. Here, it is preferable that the polymerization is carried out under an acidic condition (the reaction solution during the polymerization has a pH of from 1 to 6 at 25° C., and the degree of neutralization during the polymerization is from 1 to 25% by mole) while adjusting the dropping time of each of the dropping components. Also, at the time of completion of the polymerization reaction, the concentration of the polymeric solids content is preferably 35% by weight or more, and the resulting polymer preferably has a weight average molecular weight in the range of from 500 to 30,000, and more preferably from 1,000 to 20,000. When the weight average molecular weight of the resulting (meth)acrylic acid based polymer falls within the foregoing range, the amount of the initiator to be added to the polymerization reaction system can be markedly controlled, and therefore, such is advantageous from the standpoint of costs. Further, in the case where sulfurous acid gas is generated in the manufacturing step, it is possible to efficiently and effectively prevent (reduce) the generation of such gas or the formation of impurities. For that reason, in particular, by applying the production process of the invention to production of a (meth)acrylic acid based polymer, it is possible to efficiently produce a (meth)acrylic acid based polymer that can markedly and effectively reveal various performances such as high dispersion ability, high chelating ability and high gelation resistance at high levels. That is, a polymer that can be suitably used as a dispersant of inorganic pigments, a scale preventive, a detergent builder, and the like can be produced in high grade and at low costs. In addition, it is also possible to reduce the costs by markedly suppressing an increase in the amount of an initiator to be added to the polymerization reaction system.

Examples of applications of the (meth)acrylic acid based polymer obtained from the process of the invention include an aqueous dispersant (including a pigment dispersant), a scale preventive (scale inhibitor), and a detergent builder and detergents using the same. But, it should be construed that the invention is not limited to these applications but can be widely applied. For example, the resulting (meth)acrylic acid based polymer can also be applied to a metal ion sealant, a thickener, various binders, and the like.

Second Embodiment:

The second embodiment of the production process of the invention will be described below in detail.

The (meth)acrylic acid based polymer is synthesized by polymerizing a (meth)acrylic acid based monomer in a polymerization reaction solution using an initiator. First of all, the respective components to be used in the polymerization will be described.

Examples of the (meth)acrylic acid based monomer include acrylic acid, methacrylic acid, and derivatives thereof.

A usual dropping amount of the (meth)acrylic acid based monomer is from 30 to 60% by weight based on the weight of the polymer solution obtained after ultimate neutralization. When the (meth)acrylic acid based monomer is compounded in an amount falling within this range, such is useful from the standpoint of productivity.

A solvent of the polymerization reaction solution is preferably an aqueous solvent, and more preferably water. For the sake of enhancing solubility of the (meth)acrylic acid based monomer in the solvent, an organic solvent may be properly added so far as the polymerization of the monomer is not adversely affected. Examples of organic solvents to be added include lower alcohols such as methanol and ethanol; amides such as dimethylformamide; and ethers such as diethyl ether and dioxane.

The polymerization reaction solution contains one or more of a persulfate and one or more of a bisulfite as the initiator. When the polymerization is carried out using a persulfate and a bisulfite as an initiator system, a sulfonic acid group can be introduced into the terminals of the (meth)acrylic acid based polymer. By introducing a sulfonic acid group, the resulting (meth)acrylic acid based polymer can reveal good gelation resistance.

A weight ratio of the bisulfite to the persulfate to be added is in the range of from 0.5/1 to 10/1. When the weight ratio of the bisulfite to the persulfate is less than 0.5/1, the effect due to the bisulfite is not sufficient so that it may possibly become impossible to introduce a sulfonic acid group into the terminals. Also, when the weight ratio of the bisulfite to the persulfate is less than 0.5/1, the weight average molecular weight of the resulting (meth)acrylic acid based polymer tends to become high. On the other hand, when the weight ratio of the bisulfite to the persulfate exceeds 10/1, the effect due to the bisulfite may not possibly be obtained in proportion to its addition ratio. However, it should not be construed that the compounding amount of the persulfate and the bisulfite is limited to this range. The specific compounding amount of the persulfate and the bisulfite should be determined according to the use application or use environment. For example, in the case where the (meth)acrylic acid based polymer is used as a detergent builder, when the weight average molecular weight is too high, the performance may possibly lower. Accordingly, the compounding amount of the persulfate and the bisulfite may be determined while taking into consideration such that the weight average molecular weight does not excessively increase.

With respect to the addition amount of the persulfate and the bisulfite, the compounding amount of the persulfate and bisulfite is usually from 2 to 20 g per mole of the (meth) acrylic acid based monomer to be used. When the persulfate and the bisulfite are added in an amount falling within this range, it is easy to introduce a sulfonic acid group into the terminals of the resulting (meth)acrylic acid based polymer.

Examples of the persulfate include sodium persulfate, potassium persulfate, and ammonium persulfate. Examples of the bisulfite include sodium bisulfite, potassium bisulfite, and ammonium bisulfite. If desired, sulfites, pyrosulfites, etc. may be used.

For the sake of introducing a sulfonic acid group into the terminals of the resulting (meth)acrylic acid based polymer, the persulfate and the bisulfite must be used in an amount to some extent. However, when the compounding amount of the persulfate and the bisulfite is too large, the amount of impurities derived from these compounds increases. Also, sulfurous acid gas generated upon decomposition of the bisulfite to be compounded as the initiator adversely affects the safety of workers at the time of polymerization reaction and the circumferential environment. Accordingly, it is preferable that the compounding amount of the persulfate and the bisulfite is small. In the invention, by compounding a heavy metal ion in the polymerization reaction solution, it has become possible to reduce the compounding amount of the persulfate and the bisulfite.

That is, in the invention, the polymerization reaction solution contains a heavy metal ion. The heavy metal as referred to herein means a metal having a specific gravity of 4 g/cm³ or more. Specific examples of the heavy metal include iron, cobalt, manganese, chromium, molybdenum, tungsten, copper, silver, gold, lead, platinum, iridium, osmium, palladium, rhodium, and ruthenium. Two or more heavy metals may be used. The polymerization reaction solution contains such ions. The polymerization reaction solution preferably contains an iron ion. The valency of the heavy metal ion is not particularly limited. For example, in the case where iron is used as the heavy metal, the iron ion dissolved in the polymerization reaction solution may be $Fe^{2+}$ or $Fe^{3+}$, or a combination thereof.

The heavy metal ion can be added using a solution having a heavy metal compound dissolved therein. The heavy metal compound to be used is determined according to the heavy metal ion that is desired to be contained in the polymerization reaction solution. In the case where water is used as a solvent, a water-soluble heavy metal salt is preferable. Examples of water-soluble heavy metal salts include a Mohr's salt $(Fe(NH_4)_2(SO_4)_2 \cdot 6H_2O)$, ferrous sulfate heptahydrate, ferrous chloride, ferric chloride, and manganese chloride.

The content of the heavy metal iron is not particularly limited but is preferably from 0.1 to 10 ppm based on the total weight of the polymerization reaction solution at the time of completion of the polymerization reaction. The time of completion of the polymerization reaction as referred to herein means the time when the polymerization reaction is substantially completed in the polymerization reaction solution, thereby obtaining the desired polymer. For example, in the case where the polymerized polymer is neutralized with an alkaline component in the polymerization reaction solution, the content of the heavy metal ion is calculated based on the total weight of the polymerization reaction solution after neutralization. In the case where two or more heavy metal ions are contained, the total amount of the heavy metal ions may fall within the foregoing range.

When the content of the heavy metal ion is less than 0.1 ppm, the effect due to the heavy metal ion may not possibly be revealed sufficiently. On the other hand, when the content of the heavy metal ion exceeds 10 ppm, the color tone of the polymer may possibly be deteriorated. Also, when the content of the heavy metal ion is too high, stains when used as a detergent builder or scales when used as a scale preventive may possibly increase.

The polymerization method is not particularly limited. One preferred embodiment is a method in which a (meth)acrylic acid based monomer and a persulfate and a bisulfite as the initiator are dropped in an aqueous solution having a heavy metal ion compounded therein in advance. By dropping a solution containing the (meth)acrylic acid based monomer, a solution containing the persulfate, and a solution containing the bisulfite, the respective components react with each other in the polymerization reaction solution. The concentration of each of the solutions is not particularly limited.

The dropping time of each of the components is usually from 60 minutes to 420 minutes, and preferably from 90 minutes to 360 minutes. A part or the whole of the (meth)acrylic acid based monomer may be charged in the reaction system in advance. The dropping time may be varied depending upon the respective components.

When the dropping time is shorter than 60 minutes, the effect brought by the persulfate and the bisulfite to be added as the initiator is reduced so that the introduction of a sulfonic acid group may possibly become insufficient. On the other hand, when the dropping time exceeds 420 minutes, there is a problem in productivity of the (meth) acrylic acid based polymer. However, the dropping time may fall outside the foregoing range depending upon the circumstance.

The dropping rate of each of the components is not particularly limited. For example, the dropping rate may be always constant from start to completion of the dropping or may be changed as the need arises. For the sake of enhancing the manufacturing efficiency of the polymer, the respective components are dropped such that the concentration of solids content in the polymerization reaction solution after completion of dropping, i.e., the concentration of solids content generated by polymerization of the monomer, is preferably 40% by weight or more, more preferably 45% by weight or more, further preferably 50% by weight or more, and especially preferably 55% by weight or more. In the case where the reaction is carried out under such a condition that the concentration of solids content in the polymerization reaction solution after completion of dropping is 40% by weight or more, it is preferable that the polymerization reaction solution is acidic. Concretely, when the polymerization reaction is carried out in the acidic side (the degree of neutralization is less than 40% by mole), it is possible to suppress an increase in the viscosity of the polymerization reaction solution.

The polymerization temperature in the polymerization of the (meth)acrylic acid based monomer is preferably from 25 to 99° C., more preferably from 50 to 95° C., and further preferably 70° C. or more but lower than 90° C. In the case where the polymerization temperature is lower than 25° C., the weight average molecular weight of the resulting polymer may possibly increase, and the amount of formed impurities may possibly increase. Also, since the polymerization time is prolonged, the productivity of the polymer lowers. On the other hand, in the case where the polymerization temperature exceeds 99° C., the bisulfite used as the initiator is decomposed, whereby a large amount of sulfurous acid gas may possibly be generated. Since the sulfurous acid gas dissolved in the liquid phase can be a causative agent of impurities, when a large amount of sulfurous acid gas is generated, the amount of impurities in the resulting polymer may possibly increase. Also, the recovery costs of sulfurous acid gas in the gas phase increase. Incidentally, the polymerization temperature as referred to herein means the temperature of the polymerization reaction solution. The measurement method and control means of the polymerization temperature are not particularly limited, but the polymerization temperature may be measured using generally employed devices.

The pressure at the time of the polymerization is not particularly limited, and any of atmospheric pressure, reduced pressure or elevated pressure may be employed.

In order to obtain a polymer having a low molecular weight, it is preferable that the polymerization reaction is carried out under an acidic condition. Concretely, the degree of neutralization is preferably less than 40% by mole, more preferably less than 20% by mole, and further preferably less than 10% by mole. When the degree of neutralization during the polymerization reaction is high, a large amount of impurities may possibly be formed. The lower limit of the degree of neutralization during the polymerization reaction is not particularly limited. However, when the degree of neutralization during the polymerization reaction is too low, the amount of generated sulfurous acid gas may possibly increase. When a balance among these factors is taken into consideration, the degree of neutralization during the polymerization reaction may be kept at about 5% by mole.

The measurement method of the degree of neutralization is not particularly limited so far as it is a measurement method having reproducibility at a fixed level. For example, the method described in the following Examples can be employed. Also, the degree of neutralization can be controlled by properly adding an alkaline component or an acidic component according to the amount (mole) of the monomer to be used in the polymerization reaction solution. For the sake of increasing the degree of neutralization of the polymer obtained by advancing the polymerization reaction under an acidic condition, an alkaline component such as sodium hydroxide may be added.

When the polymerization reaction is carried out under an acidic condition, the polymerization can be carried out in a high concentration at one stage. For that reason, it is possible to omit a concentration step optionally necessary in the conventional production processes. Therefore, the manufacturing efficiency can be largely increased, and an increase of the manufacturing costs can be controlled.

In the case wherein the polymerization is carried out under an acidic condition, the degree of neutralization of the resulting (meth)acrylic acid based polymer can be controlled by properly adding an alkaline component after completion of the polymerization. Examples of alkaline components include alkali metal hydroxides such as sodium hydroxide and potassium hydroxide; alkaline earth metal hydroxides such as calcium hydroxide and magnesium hydroxide; ammonia; and organic amines such as monoethanolamine, diethanolamine, and triethanolamine. These alkaline components may be used singly or in admixture of two or more thereof.

A (meth)acrylic acid based polymer can be synthesized by the foregoing reaction. The (meth)acrylic acid based polymer as referred to herein means a homopolymer formed of a (meth)acrylic acid based monomer (i.e., acrylic acid, methacrylic acid, or derivatives thereof) as a monomer. A homopolymer formed of acrylic acid or methacrylic acid as a monomer is preferable. However, the homopolymer as referred to in the present application may have a plurality of recurring units that change depending upon the degree of neutralization. For example, in the case where methacrylic acid is polymerized as the monomer, even though a part of —(COOH) is converted into —(COONa), if the same structure will be obtained by using an acid or base, such is included in the concept of the homopolymer.

Also, the homopolymer as referred to in the present application is not always a complete homopolymer but may contain a very small amount of other component so far as the effect of the invention is not hindered. Concretely, the (meth)acrylic acid based polymer of the invention may contain less than 3% by weight of other component than the monomer unit as the major component. The (meth)acrylic acid based polymer of the invention preferably contains less than 2% by weight, more preferably less than 1% by weight, further preferably less than 0.5% by weight, and especially preferably 0% by weight of other component. Incidentally, the term "containing 0% by weight of other component" means a polymer in which other component is not detected according to the usual measurement, that is, a complete homopolymer.

The resulting (meth)acrylic acid based polymer preferably has a weight average molecular weight of from 500 to 30,000, and more preferably from 1,000 to 10,000. When the weight average molecular weight falls within this range, the (meth)acrylic acid based polymer can most effectively reveal various performances such as dispersion ability, chelating ability, and gelation resistance.

In a water-soluble polymer having a molecular weight of 1,000 or more, which is used in a dispersant or scale preventive, when the molecular weight is close to 1,000, the polymer exhibits high performance in dispersion ability and gelation resistance. On the other hand, when the molecular weight of the water-soluble polymer is high, the polymer exhibits high performance in chelating ability. Therefore, it was difficult to well enhance all of three performances of dispersion ability, chelating ability and gelation resistance.

In the (meth)acrylic acid based polymer that is prepared according to the production process of the invention, a sulfonic acid group can be introduced into the terminals thereof. In the case where a sulfonic acid group is introduced into the terminals, even when the molecular weight is relatively large, the dispersion ability and the gelation resistance become good. In particular, nevertheless the molecular weight is large, the gelation resistance is very good.

The (meth)acrylic acid based polymer produced according to the production process of the invention is excellent in various characteristics such as dispersion ability, chelating ability, and gelation resistance. Moreover, since the amount of the initiator to be used is small, the content of impurities is small, and the manufacturing costs are low. The (meth) acrylic acid based polymer having such characteristic features are very useful in various applications such as a detergent builder, a dispersant of inorganic pigments, and a scale preventive.

Incidentally, in carrying out the production process of the invention, the known technologies described in the above-cited Patent Document 1 may be applied, and the technical range of the invention is not limited to the specific embodiments described in the present specification. Also, in applying the (meth)acrylic acid based polymer produced according to the production process of the invention to various applications, known technologies may be made hereof by reference without particular limitations. Further, newly developed means may be employed.

The invention will be described below in detail with reference to the following Examples, but it should not be construed that the invention is limited thereto.

EXAMPLE 1

In an SUS-made separable flask having a capacity of 5 liters and equipped with a volume flow meter-equipped external circulation cooling device (solution holding amount: 170 mL), a reflux condenser and a stirrer, 360.0 g of pure water was charged (initially charged) and heated with stirring.

The external circulation device was actuated at a flow rate of about 50 mL/min to control the solution temperature in the separable flask at about 90° C. At this time, the outlet temperature of the external circulation device was about 55° C. Thereafter, the solution temperature was kept at about 90° C. while adjusting the flow rate with a width of ±5 mL/min.

Next, 900.0 g (10.0 moles) of an 80% acrylic acid aqueous solution (hereinafter abbreviated as "80% AA"), 41.7 g (0.5 moles) of a 48% sodium hydroxide aqueous solution (hereinafter abbreviated as "48% NaOH"), 133.3 g {2.0 g/mole as reduced against the input of the monomer (the input as referred to herein means an input of all of the monomer composition—hereinafter the same)} of a 15% sodium persulfate aqueous solution (hereinafter abbreviated as "15% NaPS"), and 71.4 g (2.5 g/mole as reduced against the input of the monomer) of a 35% sodium bisulfite aqueous solution (hereinafter abbreviated as "35% SBS")

were added, respectively from separate dropping nozzles in the polymerization reaction system kept in the fixed state at about 90° C. with stirring. The dropping time was set up at 300 minutes for 80% AA, 300 minutes for 48% NaOH, 320 minutes for 15% NAPS, and 290 minutes for 35% SBS, respectively. Also, the dropping rate of each of the components was kept at a fixed level, and the component was continuously dropped during the dropping time of the component.

After completion of dropping, the reaction solution was kept at 90° C. and ripened over 30 minutes, thereby completing the polymerization. After completion of the polymerization, the reaction solution was allowed to stand for cooling and neutralized while gradually dropping 750.0 g (9.0 moles) of 48% NaOH thereto with stirring. There was thus obtained 2,256 g (the volume is 1,735 mL determined from a specific gravity at 25° C. of 1.3) of a polymer (1) having a concentration of solids content of 45% by weight and an ultimate degree of neutralization of 95% by mole. The polymerization formulation is summarized in Table 1. Also, the molecular weight of the polymer (1) is shown in Table 11.

EXAMPLE 2

Polymerization was carried out in the same manner as in Example 1. The total charge amount of the polymer solution was 2,318 g (the volume is 1,783 mL determined from a specific gravity at 25° C. of 1.3). The polymerization formulation is summarized in Table 1. Also, the molecular weight of the resulting polymer (2) is shown in Table 11.

TABLE 1

|  |  | Example 1 Polymer (1) | Example 2 Polymer (2) |
|---|---|---|---|
| Initial charge |  |  |  |
| Pure water | (g) | 360.0 | 350.0 |
| Dropping |  |  |  |
| 80% AA aq | (g) | 900.0 | 900.0 |
|  | (mole) | 10.00 | 10.00 |
| 48% NaOH aq | (g) | 41.67 | 41.67 |
|  | (mole) | 0.50 | 0.50 |
| 35% SBS aq | (g) | 71.4 | 142.9 |
|  | (g/mole) | 2.5 | 5.0 |
| 15% NaPS aq | (g) | 133.3 | 133.3 |
|  | (g/mole) | 2.0 | 2.0 |
| Dropping time | (min) |  |  |
| 80% AA aq |  | 0 to 300 | 0 to 300 |
| 48% NaOH aq |  | 0 to 300 | 0 to 300 |
| 35% SBS aq |  | 0 to 290 | 0 to 290 |
| 15% NaPS aq |  | 0 to 320 | 0 to 310 |
| Polymerization and ripening temperature | (° C.) | 90 | 90 |
| Ripening time | (min) | 30 | 30 |
| Degree of neutralization after dropping | (%) | 5.0 | 5.0 |
| Post-treatment |  |  |  |
| 48% NaOH aq | (g) | 750.0 | 750 |
|  | (mole) | 9.00 | 9.00 |
| Ultimate degree of neutralization | (%) | 95.0 | 95.0 |
| Polymerizer |  | SUS5.0L | SUS5.0L |
| Agitation blade |  | Paddle blade | Paddle blade |

EXAMPLE 3

In an SUS-made separable flask having a capacity of 5 liters and equipped with a volume flow meter-equipped external circulation cooling device (solution holding amount: 170 mL), a reflux condenser and a stirrer, 370.0 g of pure water, 232.0 g (2.0 moles) of maleic anhydride (hereinafter abbreviated as "anhydrous MA"), and 16.6 g (0.2 moles) of 48% NaOH were charged (initially charged) and heated with stirring.

The external circulation device was actuated at a flow rate of about 50 mL/min to control the solution temperature in the separable flask at about 90° C. At this time, the outlet temperature of the external circulation device was about 55° C. Thereafter, the solution temperature was kept at about 90° C. while adjusting the flow rate with a width of ±5 mL/min.

Next, 720.0 g (8.0 moles) of 80% AA, 33.3 g (0.4 moles) of 48% NaOH, 266.6 g (4.0 g/mole as reduced against the input of the monomer) of 15% NaPS, and 228.6 g (8.0 g/mole as reduced against the input of the monomer) of 35% SBS were added, respectively from separate dropping nozzles in the polymerization reaction system kept in the fixed state at about 90° C. with stirring. The dropping time was set up at 180 minutes for 80% AA, 180 minutes for 48% NaOH, 185 minutes for 15% NaPS, and 175 minutes for 35% SBS, respectively. Also, the dropping rate of each of the components was kept at a fixed level, and the component was continuously dropped during the dropping time of the component.

After completion of dropping, the reaction solution was kept at 90° C. and ripened over 30 minutes, thereby completing the polymerization. After completion of the polymerization, the reaction solution was allowed to stand for cooling and neutralized while gradually dropping 800.0 g (9.6 moles) of 48% NaOH thereto with stirring. There was thus obtained 2,667 g (the volume is 2,052 mL determined from a specific gravity at 25° C. of 1.3) of a polymer (3) having a concentration of solids content of 45% by weight and an ultimate degree of neutralization of 85% by mole. The polymerization formulation is summarized in Table 2. Also, the molecular weight of the polymer (3) is shown in Table 11.

TABLE 2

|  |  | Example 3 Polymer (3) |
|---|---|---|
| Initial charge |  |  |
| Anhydrous MA | (g) | 232.0 |
|  | (mole) | 2.0 |
| 48% NaOH | (g) | 16.6 |
|  | (mole) | 0.20 |
| Pure water | (g) | 370.0 |
| Initial degree of neutralization | (%) | 5.0 |
| Dropping |  |  |
| 80% AA aq | (g) | 720.0 |
|  | (mole) | 8.0 |
| 48% NaOH aq | (g) | 33.3 |
|  | (mole) | 0.400 |
| 35% SBS aq | (g) | 228.6 |
|  | (g/mole) | 8.0 |
| 15% NaPS aq | (g) | 266.6 |
|  | (g/mole) | 4.0 |
| Dropping time | (min) |  |
| 80% AA aq |  | 0 to 180 |
| 48% NaOH aq |  | 0 to 180 |
| 35% SBS aq |  | 0 to 175 |
| 15% NaPS aq |  | 0 to 185 |
| Polymerization and ripening temperature | (° C.) | 90.0 |
| Ripening time | (min) | 30.0 |

TABLE 2-continued

|  |  | Example 3 Polymer (3) |
|---|---|---|
| Degree of neutralization after dropping | (%) | 5.0 |
| Post-treatment |  |  |
| 48% NaOH aq | (g) | 800.0 |
|  | (mole) | 9.6 |
| Ultimate degree of neutralization | (%) | 85.0 |
| Polymerizer |  | SUS5L |
| Agitation blade | | Paddle blade |

EXAMPLE 4

In an SUS-made separable flask having a capacity of 5 liters and equipped with a volume flow meter-equipped external circulation cooling device (solution holding amount: 170 mL), a reflux condenser and a stirrer, 510.0 g of pure water was charged (initially charged) and heated with stirring.

The external circulation device was actuated at a flow rate of about 50 mL/min to control the solution temperature in the separable flask at about 90° C. At this time, the outlet temperature of the external circulation device was about 55° C. Thereafter, the solution temperature was kept at about 90° C. while adjusting the flow rate with a width of ±5 mL/min.

Next, 263.0 g (0.4 moles) of an 80% isoprenol adduct with 10 moles of ethylene oxide (hereinafter abbreviated as "80% IPN-10), 684.0 g (7.6 moles) of 80% AA, 31.7 g (0.4 moles) of 48% NaOH, 213.4 g (4.0 g/mole as reduced against the input of the monomer) of 15% NaPS, and 182.8 g (8.0 g/mole as reduced against the input of the monomer) of 35% SBS were added, respectively from separate dropping nozzles in the polymerization reaction system kept in the fixed state at about 90° C. with stirring. The dropping time was set up at 170 minutes for 80% IPN-10, 180 minutes for 80% AA, 180 minutes for 48% NaOH, 210 minutes for 15% NaPS, and 180 minutes for 35% SBS, respectively. Also, the dropping rate of each of the components was kept at a fixed level, and the component was continuously dropped during the dropping time of the component.

After completion of dropping, the reaction solution was kept at 90° C. and ripened over 30 minutes, thereby completing the polymerization. After completion of the polymerization, the reaction solution was allowed to stand for cooling and neutralized while gradually dropping 285.0 g (3.4 moles) of 48% NaOH thereto with stirring. There was thus obtained 2,170 g (the volume is 1,808 mL determined from a specific gravity at 25° C. of 1.2) of a polymer (4) having a concentration of solids content of 45% by weight and an ultimate degree of neutralization of 50% by mole. The polymerization formulation is summarized in Table 3. Also, the molecular weight of the polymer (4) is shown in Table 11.

TABLE 3

|  |  | Example 4 Polymer (4) |
|---|---|---|
| Initial charge |  |  |
| Pure water | (g) | 510.0 |
| Dropping |  |  |
| 80% AA aq | (g) | 684.0 |
|  | (mole) | 7.60 |
| 80% IPN-10 | (g) | 263.0 |
|  | (mole) | 0.40 |

TABLE 3-continued

|  |  | Example 4 Polymer (4) |
|---|---|---|
| 48% NaOH aq | (g) | 31.7 |
|  | (mole) | 0.38 |
| 35% SBS aq | (g) | 182.8 |
|  | (g/mole) | 8.0 |
| 15% NaPS aq | (g) | 213.4 |
|  | (g/mole) | 4.0 |
| Dropping time | (min) |  |
| 80% AA aq |  | 0 to 180 |
| 80% IPN-10 |  | 0 to 170 |
| 48% NaOH aq |  | 0 to 180 |
| 35% SBS aq |  | 0 to 180 |
| 15% NaPS aq |  | 0 to 210 |
| Water |  | — |
| Polymerization and ripening temperature | (° C.) | 90 |
| Ripening time | (min) | 30 |
| Degree of neutralization after dropping | (%) | 5.0 |
| Post-treatment |  |  |
| 48% NaOH aq | (g) | 285.0 |
|  | (mole) | 3.42 |
| Ultimate degree of neutralization | (%) | 50.0 |
| Polymerizer |  | SUS5L |
| Agitation blade |  | Paddle blade |

EXAMPLE 5

In an SUS-made separable flask having a capacity of 5 liters and equipped with a volume flow meter-equipped internal coil cooling device using water at about 30° C. as a cooling medium, a reflux condenser and a stirrer, 405.0 g of pure water was charged (initially charged) and heated with stirring.

The internal coil cooling device was actuated at a flow rate of about 80 mL/min to control the solution temperature in the separable flask at about 90° C. Thereafter, the solution temperature was kept at about 90° C. while adjusting the flow rate with a width of ±5 mL/min.

Next, 900.0 g (10.0 moles) of 80% AA, 41.7 g (0.5 moles) of 48% NaOH, 33.3 g (0.5 g/mole as reduced against the input of the monomer) of 15% NaPS, and 200.0 g (7.0 g/mole as reduced against the input of the monomer) of 35% SBS were added, respectively from separate dropping nozzles in the polymerization reaction system kept in the fixed state at about 90° C. with stirring. The dropping time was set up at 300 minutes for 80% AA, 300 minutes for 48% NaOH, 310 minutes for 15% NaPS, and 290 minutes for 35% SBS, respectively. Also, the dropping rate of each of the components was kept at a fixed level, and the component was continuously dropped during the dropping time of the component.

After completion of dropping, the reaction solution was kept at 90° C. and ripened over 30 minutes, thereby completing the polymerization. After completion of the polymerization, the reaction solution was allowed to stand for cooling and neutralized while gradually dropping 750.0 g (9.0 moles) of 48% NaOH thereto with stirring. There was thus obtained a polymer (5) having a concentration of solids content of 45% by weight and an ultimate degree of neutralization of 95% by mole. The polymerization formulation is summarized in Table 4. Also, the molecular weight of the polymer (5) is shown in Table 11.

TABLE 4

|  |  | Example 5 Polymer (5) |
|---|---|---|
| Initial charge |  |  |
| Pure water | (g) | 405.0 |
| Dropping |  |  |
| 80% AA aq | (g) | 900.0 |
|  | (mole) | 10.00 |
| 48% NaOH aq | (g) | 41.67 |
|  | (mole) | 0.50 |
| 35% SBS aq | (g) | 200.0 |
|  | (g/mole) | 7.0 |
| 15% NaPS aq | (g) | 33.3 |
|  | (g/mole) | 0.5 |
| Dropping time | (min) |  |
| 80% AA aq |  | 0 to 300 |
| 48% NaOH aq |  | 0 to 300 |
| 35% SBS aq |  | 0 to 290 |
| 15% NaPS aq |  | 0 to 310 |
| Polymerization and ripening temperature | (° C.) | 90 |
| Ripening time | (min) | 30 |
| Degree of neutralization after dropping | (%) | 5.0 |
| Post-treatment |  |  |
| 48% NaOH aq | (g) | 750.0 |
|  | (mole) | 9.00 |
| Ultimate degree of neutralization | (%) | 95.0 |
| Polymerizer |  | SUS5.0L |
| Agitation blade |  | Paddle blade |

EXAMPLE 6

In an SUS-made separable flask having a capacity of 5 liters and equipped with a volume flow meter-equipped external circulation cooling device (solution holding amount: 170 mL), a reflux condenser and a stirrer, 386.0 g of pure water was charged (initially charged) and heated with stirring.

The external circulation device was actuated at a flow rate of about 50 mL/min to control the solution temperature in the separable flask at about 99° C. At this time, the outlet temperature of the external circulation device was about 70° C. Thereafter, the solution temperature was kept at about 99° C. while adjusting the flow rate with a width of ±5 mL/min.

Next, 900.0 g (10.0 moles) of 80% AA, 666.6 g (8.0 moles) of 48% NaOH, 266.6 g (4.0 g/mole as reduced against the input of the monomer) of 15% NaPS, and 228.6 g (8.0 g/mole as reduced against the input of the monomer) of a 35% hydrogen peroxide aqueous solution (hereinafter abbreviated as "35% $H_2O_2$") were added, respectively from separate dropping nozzles in the polymerization reaction system kept in the fixed state at about 99° C. with stirring. The dropping time was set up at 180 minutes for 80% AA, 180 minutes for 48% NaOH, 190 minutes for 15% NaPS, and 60 minutes for 35% $H_2O_2$, respectively. Also, the dropping rate of each of the components was kept at a fixed level, and the component was continuously dropped during the dropping time of the component.

After completion of dropping, the reaction solution was kept at 99° C. and ripened over 20 minutes, thereby completing the polymerization. After completion of the polymerization, 125.0 g (1.5 moles) of 48% NaOH was dropped in the reaction solution over 30 minutes while keeping the temperature at about 99° C., thereby neutralizing the reaction solution. There was thus obtained 2,573 g (the volume is 2,144 mL determined from a specific gravity at 25° C. of 1.2) of a polymer (6) having a concentration of solids content of 40% by weight and an ultimate degree of neutralization of 95% by mole. The polymerization formulation is summarized in Table 5. The molecular weight of the polymer (6) and the behavior of foaming during the polymerization are shown in Table 11.

EXAMPLE 7

Polymerization was carried out in the same manner as in Example 6. The total charge amount of the polymer solution was 2,481 g (the volume is 2,068 mL determined from a specific gravity at 25° C. of 1.2). The polymerization formulation is summarized in Table 5. The molecular weight of the resulting polymer (7) and the behavior of foaming during the polymerization are shown in Table 11.

TABLE 5

|  |  | Example 6 Polymer (6) | Example 7 Polymer (7) |
|---|---|---|---|
| Initial charge |  |  |  |
| Pure water | (g) | 386.0 | 386.0 |
| Dropping |  |  |  |
| 80% AA aq | (g) | 900.0 | 900.0 |
|  | (mole) | 10.00 | 10.00 |
| 48% NaOH aq | (g) | 666.6 | 750.0 |
|  | (mole) | 8.0 | 9.0 |
| 35% $H_2O_2$ aq | (g) | 228.6 | 137.2 |
|  | (g/mole) | 8.0 | 4.8 |
| 15% NaPS aq | (g) | 266.6 | 266.6 |
|  | (g/mole) | 4.0 | 4.0 |
| Dropping time | (min) |  |  |
| 80% AA aq |  | 0 to 180 | 0 to 180 |
| 48% NaOH aq |  | 0 to 180 | 0 to 180 |
| 35% $H_2O_2$ aq |  | 0 to 60 | 0 to 150 |
| 15% NaPS aq |  | 0 to 190 | 0 to 190 |
| Polymerization and ripening temperature | (° C.) | 99 | 99 |
| Ripening time | (min) | 20 | 20 |
| Post-treatment |  |  |  |
| 48% NaOH aq | (g) | 125.0 | 41.6 |
|  | (mole) | 1.5 | 0.5 |
| Ultimate degree of neutralization | (%) | 95.0 | 95.0 |
| Polymerizer |  | SUS5L | SUS5L |
| Agitation blade |  | Paddle blade | Paddle blade |

EXAMPLE 8

In an SUS-made separable flask having a capacity of 5 liters and equipped with a volume flow meter-equipped external circulation cooling device (solution holding amount: 170 mL), a reflux condenser and a stirrer, 136.4 g of pure water, 340.8 g (3.48 moles) of anhydrous MA, and 492.8 g (5.92 moles) of 48% NaOH were charged (initially charged) and heated with stirring.

The external circulation device was actuated at a flow rate of about 50 mL/min to control the solution temperature in the separable flask at about 99° C. At this time, the outlet temperature of the external circulation device was about 70° C. Thereafter, the solution temperature was kept at about 99° C. while adjusting the flow rate with a width of ±5 mL/min.

Next, 313.0 g (3.48 moles) of 80% AA, 301.4 g of pure water, 92.8 g (2.0 g/mole as reduced against the input of the monomer) of 15% NaPS, and 76.4 g (3.84 g/mole as reduced against the input of the monomer) of 35% $H_2O_2$ were added, respectively from separate dropping nozzles in the polymerization reaction system kept in the fixed state at about 99° C. with stirring. The dropping time was set up at 120 minutes for 80% AA, 80 minutes for 15% NaPS 50 minutes after start of the dropping, 80 minutes for pure water 50 minutes after start of the dropping, and 50 minutes for 35% $H_2O_2$, respectively. Also, the dropping rate of each of the components was kept at a fixed level, and the component was continuously dropped during the dropping time of the component.

After completion of dropping, the reaction solution was kept at 99° C. and ripened over 30 minutes, thereby completing the polymerization. After completion of the polymerization, the reaction solution was allowed to stand for cooling and neutralized while gradually dropping 246.4 g (2.96 moles) of 48% NaOH thereto with stirring. There was thus obtained 2,000 g (the volume is 1,538 mL determined from a specific gravity at 25° C. of 1.3) of a polymer (8) having a concentration of solids content of 45% by weight and an ultimate degree of neutralization of 85% by mole. The polymerization formulation is summarized in Table 6. The molecular weight of the polymer (8) and the behavior of foaming during the polymerization are shown in Table 11.

TABLE 6

|  |  | Example 8 Polymer (8) |
| --- | --- | --- |
| Initial charge |  |  |
| Anhydrous MA | (g) | 340.8 |
|  | (mole) | 3.48 |
| 48% NaOH | (g) | 492.8 |
|  | (mole) | 5.92 |
| Pure water | (g) | 136.4 |
| Initial degree of neutralization | (%) | 85.0 |
| Dropping |  |  |
| 80% AA aq | (g) | 313.0 |
|  | (mole) | 3.48 |
| 35% $H_2O_2$ aq | (g) | 76.4 |
|  | (g/mole) | 3.84 |
| 15% NaPS aq | (g) | 92.8 |
|  | (g/mole) | 2.0 |
| Pure water | (g) | 301.4 |
| Dropping time | (min) |  |
| 80% AA aq |  | 0 to 120 |
| 35% $H_2O_2$ aq |  | 0 to 50 |
| 15% NaPS aq |  | 50 to 130 |
| Pure water |  | 50 to 130 |
| Polymerization and ripening temperature | (° C.) | 99.0 |
| Ripening time | (min) | 30.0 |
| Degree of neutralization after dropping | (%) |  |
| Post-treatment |  |  |
| 48% NaOH aq | (g) | 246.4 |
|  | (mole) | 2.96 |
| Ultimate degree of neutralization | (%) | 85.0 |
| Polymerizer |  | SUS5L |
| Agitation blade |  | Paddle blade |

EXAMPLE 9

In an SUS-made separable flask having a capacity of 5 liters and equipped with a volume flow meter-equipped external circulation cooling device (solution holding amount: 170 mL), a reflux condenser and a stirrer, 810.0 g of pure water, 352.8 g (3.6 moles) of anhydrous MA, and 600.0 g (7.2 moles) of 48% NaOH were charged (initially charged) and heated with stirring.

The external circulation device was actuated at a flow rate of about 50 mL/min to control the solution temperature in the separable flask at about 99° C. At this time, the outlet temperature of the external circulation device was about 70° C. Thereafter, the solution temperature was kept at about 99° C. while adjusting the flow rate with a width of ±5 mL/min.

Next, 810.0 g (9.0 moles) of 80% AA, 252.0 g (3.0 g/mole as reduced against the input of the monomer) of 15% NaPS, 180.0 g (5.0 g/mole as reduced against the input of the monomer) of 35% $H_2O_2$, and 355.0 g of pure water were added, respectively from separate dropping nozzles in the polymerization reaction system kept in the fixed state at about 99° C. with stirring. The dropping time was set up at 240 minutes for 80% AA, 245 minutes for 15% NaPS, 240 minutes for 35% $H_2O_2$, and 155 minutes for pure water 90 minutes after start of the dropping, respectively. Also, the dropping rate of each of the components was kept at a fixed level, and the component was continuously dropped during the dropping time of the component.

After completion of dropping, the reaction solution was kept at 99° C. and ripened over 30 minutes, thereby completing the polymerization. After completion of the polymerization, the reaction solution was allowed to stand for cooling and neutralized while gradually dropping 615.0 g (7.4 moles) of 48% NaOH thereto with stirring. There was thus obtained 3,974 g (the volume is 3,613 mL determined from a specific gravity at 25° C. of 1.1) of a polymer (9) having a concentration of solids content of 36% by weight and an ultimate degree of neutralization of 90% by mole. The polymerization formulation is summarized in Table 7. The molecular weight of the polymer (9) and the behavior of foaming during the polymerization are shown in Table 11.

TABLE 7

|  |  | Example 9 Polymer (9) |
| --- | --- | --- |
| Initial charge |  |  |
| Anhydrous MA | (g) | 352.8 |
|  | (mole) | 3.6 |
| 48% NaOH | (g) | 600.0 |
|  | (mole) | 7.2 |
| Pure water | (g) | 810.0 |
| Initial degree of neutralization | (%) | 100.0 |
| Dropping |  |  |
| 80% AA aq | (g) | 810.0 |
|  | (mole) | 9.0 |
| 35% $H_2O_2$ aq | (g) | 180.0 |
|  | (g/mole) | 5.0 |
| 15% NaPS aq | (g) | 252.0 |
|  | (g/mole) | 3.0 |
| Pure water | (g) | 355.0 |
| Dropping time | (min) |  |
| 80% AA aq |  | 0 to 240 |
| 35% $H_2O_2$ aq |  | 0 to 240 |
| 15% NaPS aq |  | 0 to 245 |
| Pure water |  | 90 to 245 |
| Polymerization and ripening temperature | (° C.) | 99.0 |
| Ripening time | (min) | 30.0 |
| Post-treatment |  |  |
| 48% NaOH aq | (g) | 615.0 |
|  | (mole) | 7.4 |
| Ultimate degree of neutralization | (%) | 90.0 |

TABLE 7-continued

|  | Example 9<br>Polymer (9) |
|---|---|
| Polymerizer | SUS5L |
| Agitation blade | Paddle blade |

EXAMPLE 10

In an SUS-made separable flask having a capacity of 5 liters and equipped with a volume flow meter-equipped internal coil cooling device using water at about 30° C. as a cooling medium, a reflux condenser and a stirrer, 600.0 g of pure water was charged (initially charged) and heated with stirring.

The internal coil cooling device was actuated at a flow rate of about 80 mL/min to control the solution temperature in the separable flask at about 99° C. Thereafter, the solution temperature was kept at about 99° C. while adjusting the flow rate with a width of ±5 mL/min.

Next, 900.0 g (10.0 moles) of 80% AA, 666.6 g (8.0 moles) of 48% NaOH, 266.6 g (4.0 g/mole as reduced against the input of the monomer) of 15% NaPS, and 171.4 g (6.0 g/mole as reduced against the input of the monomer) of 35% $H_2O_2$ were added, respectively from separate dropping nozzles in the polymerization reaction system kept in the fixed state at about 99° C. with stirring. The dropping time was set up at 180 minutes for 80% AA, 180 minutes for 48% NaOH, 190 minutes for 15% NaPS, and 60 minutes for 35% $H_2O_2$, respectively. Also, the dropping rate of each of the components was kept at a fixed level, and the component was continuously dropped during the dropping time of the component.

After completion of dropping, the reaction solution was kept at 99° C. and ripened over 20 minutes, thereby completing the polymerization. After completion of the polymerization, the reaction solution was allowed to stand for cooling and neutralized while gradually dropping 125.0 g (1.5 moles) of 48% NaOH thereto with stirring over 30 minutes. There was thus obtained a polymer (10) having a concentration of solids content of 36% by weight and an ultimate degree of neutralization of 95% by mole. The polymerization formulation is summarized in Table 8. The molecular weight of the polymer (10) and the behavior of foaming during the polymerization are shown in Table 11.

TABLE 8

|  |  | Example 10<br>Polymer (10) |
|---|---|---|
| Initial charge |  |  |
| Pure water | (g) | 600.0 |
| Dropping |  |  |
| 80% AA aq | (g) | 900.0 |
|  | (mole) | 10.00 |
| 48% NaOH aq | (g) | 666.6 |
|  | (mole) | 8.0 |
| 35% $H_2O_2$ aq | (g) | 171.4 |
|  | (g/mole) | 6.0 |
| 15% NaPS aq | (g) | 266.6 |
|  | (g/mole) | 4.0 |
| Dropping time | (min) |  |
| 80% AA aq |  | 0 to 180 |
| 48% NaOH aq |  | 0 to 180 |

TABLE 8-continued

|  |  | Example 10<br>Polymer (10) |
|---|---|---|
| 35% $H_2O_2$ aq |  | 0 to 150 |
| 15% NaPS aq |  | 0 to 190 |
| Polymerization and ripening temperature | (° C.) | 99 |
| Ripening time | (min) | 20 |
| Post-treatment |  |  |
| 48% NaOH aq | (g) | 125.0 |
|  | (mole) | 1.5 |
| Ultimate degree of neutralization | (%) | 95.0 |
| Polymerizer |  | SUS5L |
| Agitation blade |  | Paddle blade |

COMPARATIVE EXAMPLES 1 TO 10

In Comparative Examples 1 to 10, the polymerizations of Examples 1 to 10 were respectively carried out under boiling-point reflux conditions without using an external circulation cooling device or an internal coil cooling device. Weight average molecular weights of the resulting polymers and the presence or absence of foaming are shown in Table 11. It is clear that by controlling the temperature according to the invention, a polymer having a desired molecular weight can be obtained without causing foaming.

EXAMPLE 11

In an SUS-made separable flask having a capacity of 5 liters and equipped with a volume flow meter-equipped external circulation cooling device (solution holding amount: 170 mL), a reflux condenser and a stirrer, 350.0 g of pure water and 0.0162 g of $Fe(NH_4)_2(SO_4)_2.6H_2O$ (Mohr's salt) were charged (initially charged) and heated with stirring. The concentration of an iron ion as a heavy metal ion against the total weight of the polymerization reaction solution at the time of completion of the polymerization reaction was calculated and found to be 1 ppm.

The external circulation device was actuated at a flow rate of about 50 mL/min to control the solution temperature in the separable flask at about 90° C. At this time, the outlet temperature of the external circulation device was about 55° C. Thereafter, the solution temperature was kept at about 90° C. while adjusting the flow rate with a width of ±5 mL/min.

Next, 900.0 g (10.0 moles) of an 80% acrylic acid aqueous solution (hereinafter abbreviated as "80% AA"), 41.7 g (0.5 moles) of a 48% sodium hydroxide aqueous solution (hereinafter abbreviated as "48% NaOH"), 133.3 g {2.0 g/mole as reduced against the input of the monomer (the input as referred to herein means an input of all of the monomer composition—hereinafter the same)} of a 15% sodium persulfate aqueous solution (hereinafter abbreviated as "15% NaPS"), and 142.9 g (5.0 g/mole as reduced against the input of the monomer) of a 35% sodium bisulfite aqueous solution (hereinafter abbreviated as "35% SBS") were added, respectively from separate dropping nozzles in the polymerization reaction system kept in the fixed state at about 90° C. with stirring. The dropping time was set up at 180 minutes for 80% AA, 180 minutes for 48% NaOH, 185 minutes for 15% NaPS, and 175 minutes for 35% SBS, respectively. Also, the dropping rate of each of the components was kept at a fixed level, and the component was continuously dropped during the dropping time of the component.

After completion of dropping, the reaction solution was kept at 90° C. and ripened over 30 minutes, thereby completing the polymerization. After completion of the polymerization, the reaction solution was allowed to stand for cooling and neutralized while gradually dropping 750.0 g (9.0 moles) of 48% NaOH thereto with stirring. Incidentally, the "concentration of an iron ion as a heavy metal ion against the total weight of the polymerization reaction solution at the time of completion of the polymerization reaction" was calculated based on the total weight of the polymerization reaction solution at this time.

There was thus obtained 2,318 g (the volume is 1,783 mL determined from a specific gravity at 25° C. of 1.3) of a polymer (11) having a concentration of solids content of 45% by weight and an ultimate degree of neutralization of 95% by mole. The polymerization formulation is summarized in Table 9. Also, the molecular weight of the polymer (11) is shown in Table 11.

EXAMPLE 12

Polymerization was carried out in the same manner as in Example 11. The total charge amount of the polymer solution was 2,328 g (the volume is 1,791 mL determined from a specific gravity at 25° C. of 1.3). The polymerization formulation is summarized in Table 9. Also, the molecular weight of the resulting polymer (12) is shown in Table 11.

EXAMPLES 13 TO 15

Polymers (13) to (15) were obtained in the same manner as in Example 11. The polymerization formulations are summarized in Table 9. Also, the molecular weights of the resulting polymers (13) to (15) are shown in Table 11.

TABLE 9

|  |  | Example 11 Polymer (11) | Example 12 Polymer (12) | Example 13 Polymer (13) | Example 14 Polymer (14) | Example 15 Polymer (15) |
| --- | --- | --- | --- | --- | --- | --- |
| Initial charge |  |  |  |  |  |  |
| Pure water | (g) | 350.0 | 350.0 | 350.0 | 350.0 | 350.0 |
| Mohr's salt | (g) | 0.0162 | 0.0488 | 0.1828 | 0.0484 | 0.0484 |
| Concentration of iron | (ppm) | 1 | 3 | 10 | 3 | 3 |
| Dropping |  |  |  |  |  |  |
| 80% AA aq | (g) | 900.0 | 900.0 | 900.0 | 900.0 | 900.0 |
|  | (mole) | 10.00 | 10.00 | 10.00 | 10.00 | 10.00 |
| 48% NaOH aq | (g) | 41.67 | 41.67 | 41.67 | 41.67 | 41.67 |
|  | (mole) | 0.50 | 0.50 | 0.50 | 0.50 | 0.50 |
| 35% SBS aq | (g) | 142.9 | 142.9 | 142.9 | 114.3 | 142.9 |
|  | (g/mole) | 5.0 | 5.0 | 5.0 | 4.0 | 5.0 |
| 15% NaPS aq | (g) | 133.3 | 133.3 | 133.3 | 133.3 | 56.7 |
|  | (g/mole) | 2.0 | 2.0 | 2.0 | 2.0 | 1.0 |
| Dropping time | (min) |  |  |  |  |  |
| 80% AA aq |  | 0 to 180 | 0 to 180 | 0 to 180 | 0 to 180 | 0 to 180 |
| 48% NaOH aq |  | 0 to 180 | 0 to 180 | 0 to 180 | 0 to 180 | 0 to 180 |
| 35% SBS aq |  | 0 to 175 | 0 to 175 | 0 to 175 | 0 to 175 | 0 to 175 |
| 15% NaPS aq |  | 0 to 185 | 0 to 185 | 0 to 185 | 0 to 185 | 0 to 185 |
| Polymerization and ripening temperature | (° C.) | 90 | 90 | 90 | 90 | 90 |
| Ripening time | (min) | 30 | 30 | 30 | 30 | 30 |
| Degree of neutralization after dropping | (%) | 5.0 | 5.0 | 5.0 | 5.0 | 5.0 |
| Post-treatment |  |  |  |  |  |  |
| 48% NaOH aq | (g) | 750.0 | 750.0 | 750.0 | 750.0 | 750.0 |
|  | (mole) | 9.0 | 9.0 | 9.0 | 9.0 | 9.0 |
| Ultimate degree of neutralization | (%) | 95.0 | 95.0 | 95.0 | 95.0 | 95.0 |
| Polymerizer |  | SUS5.0L | SUS5.0L | SUS5.0L | SUS5.0L | SUS5.0L |
| Agitation blade |  | Paddle blade | Paddle blade | Paddle blade | Paddle blade | Paddle blade |
| Total charge amount | (g) | 2,318 | 2,318 | 2,318 | 2,296 | 2,296 |

EXAMPLE 16

In an SUS-made separable flask having a capacity of 5 liters and equipped with a volume flow meter-equipped external circulation cooling device (solution holding amount: 170 mL), a reflux condenser and a stirrer, 510.0 g of pure water and 0.0524 g of $Fe(NH_4)_2(SO_4)_2 \cdot 6H_2O$ (Mohr's salt) were charged (initially charged) and heated with stirring. The concentration of an iron ion as a heavy metal ion against the total weight of the polymerization reaction solution at the time of completion of the polymerization reaction was calculated and found to be 3 ppm.

The external circulation device was actuated at a flow rate of about 50 mL/min to control the solution temperature in the separable flask at about 90° C. At this time, the outlet temperature of the external circulation device was about 55° C. Thereafter, the solution temperature was kept at about 90° C. while adjusting the flow rate with a width of ±5 mL/min.

Next, 263.0 g (0.4 moles) of an 80% isoprenol adduct with 10 moles of ethylene oxide (hereinafter abbreviated as "80% IPN-10), 684.0 g (7.6 moles) of 80% AA, 31.7 g (0.4 moles) of 48% NaOH, 213.4 g (4.0 g/mole as reduced against the input of the monomer) of 15% NaPS, and 182.8 g (8.0 g/mole as reduced against the input of the monomer) of 35% SBS were added, respectively from separate dropping nozzles in the polymerization reaction system kept in the fixed state at about 90° C. with stirring. The dropping time was set up at 180 minutes for 80% IPN-10, 180 minutes for 80% AA, 180 minutes for 48% NaOH, 180 minutes for 35% SBS, and 210 minutes for 15% NaPS, respectively. Also, the dropping rate of each of the components was kept at a fixed level, and the component was continuously dropped during the dropping time of the component.

After completion of dropping, the reaction solution was kept at 90° C. and ripened over 30 minutes, thereby completing the polymerization. After completion of the polymerization, the reaction solution was allowed to stand for cooling and neutralized while gradually dropping 601.6 g (7.2 moles) of 48% NaOH thereto with stirring. Incidentally, the "concentration of an iron ion as a heavy metal ion against the total weight of the polymerization reaction solution at the time of completion of the polymerization reaction" was calculated based on the total weight of the polymerization reaction solution at this time.

There was thus obtained 2,586 g (the volume is 1,989 mL determined from a specific gravity at 25° C. of 1.3) of a polymer (16) having a concentration of solids content of 45% by weight and an ultimate degree of neutralization of 95% by mole. The polymerization formulation is summarized in Table 10. Also, the molecular weight of the polymer (16) is shown in Table 11.

TABLE 10

|  |  | Example 16 Polymer (16) |
|---|---|---|
| Initial charge |  |  |
| Pure water | (g) | 510.0 |
| Mohr's salt | (g) | 0.0524 |
| Concentration of iron | (ppm) | 3 |
| Dropping |  |  |
| 80% AA aq | (g) | 684.0 |
|  | (mole) | 7.60 |
| 80% IPN-10 | (g) | 263.0 |
|  | (mole) | 0.40 |
| 48% NaOH aq | (g) | 31.7 |
|  | (mole) | 0.38 |
| 35% SBS aq | (g) | 182.8 |
|  | (g/mole) | 8.0 |
| 15% NaPS aq | (g) | 213.4 |
|  | (g/mole) | 4.0 |
| Dropping time | (min) |  |
| 80% AA aq |  | 0 to 180 |
| 80% IPN-10 |  | 0 to 180 |
| 48% NaOH aq |  | 0 to 180 |
| 35% SBS aq |  | 0 to 180 |
| 15% NaPS aq |  | 0 to 210 |
| Water |  | — |
| Polymerization and ripening temperature | (° C.) | 90 |
| Ripening time | (min) | 30 |
| Degree of neutralization after dropping | (%) | 5.0 |
| Post-treatment |  |  |
| 48% NaOH aq | (g) | 601.6 |
|  | (mole) | 7.20 |
| Ultimate degree of neutralization | (%) | 95.0 |
| Polymerizer |  | SUS5L |
| Agitation blade |  | Paddle blade |
| Total charge amount | (g) | 2,586 |

COMPARATIVE EXAMPLES 11 TO 16

In Comparative Examples 11 to 16, the polymerizations of Examples 11 to 16 were respectively carried out under boiling-point reflux conditions without using an external circulation cooling device or an internal coil cooling device. Weight average molecular weights (Mw) of the resulting polymers and the presence or absence of foaming are shown in Table 11.

The weight average molecular weight (Mw) of a polymer was measured by GPC (gel permeation chromatography). Incidentally, as a sample as used herein, the polymer obtained by the foregoing polymerization was used as it was. The measurement condition and devices are as follows.

G-3000PWXL (a trade name manufactured by Tosoh Corporation) was used as a column of GPC.

An aqueous solution prepared by adding pure water to 34.5 g of disodium hydrogenphosphate 12-hydrate (a special grade reagent) and 46.2 g of sodium dihydrogenphosphate dihydrate (a special grade reagent) to make the total amount to 5,000 g and filtering the mixture by a 0.45-$\mu$m membrane filter was used as a mobile phase.

Model 481 manufactured by Waters Corporation was used as a detector with a detection wavelength UV of 214 nm.

L-7110 (a trade name) manufactured by Hitachi, Ltd. was used as a pump.

A flow rate of the mobile phase was fixed at 0.5 mL/min, and the temperature was set up at 35° C. A calibration curve was prepared using a poly(sodium acrylate) standard sample manufactured by Sowa Kagaku Co., Ltd.

TABLE 11

|  | Mw | Foaming |  | Mw | Foaming |
|---|---|---|---|---|---|
| Example 1 | 19,000 | — | Comparative Example 1 | 100,000 | — |
| Example 2 | 5,800 | — | Comparative Example 2 | 25,000 | — |
| Example 3 | 10,000 | — | Comparative Example 3 | 38,000 | — |
| Example 4 | 8,800 | — | Comparative Example 4 | 41,000 | — |
| Example 5 | 5,200 | — | Comparative Example 5 | 22,000 | — |
| Example 6 | 7,300 | Nil | Comparative Example 6 | 7,200 | Vigorous |
| Example 7 | 11,000 | Nil | Comparative Example 7 | 12,000 | Vigorous |
| Example 8 | 11,000 | Nil | Comparative Example 8 | 11,000 | Vigorous |
| Example 9 | 10,000 | Nil | Comparative Example 9 | 9,800 | Vigorous |
| Example 10 | 9,600 | Nil | Comparative Example 10 | 9,800 | Vigorous |
| Example 11 | 4,800 | — | Comparative Example 11 | 18,000 | — |
| Example 12 | 4,400 | — | Comparative Example 12 | 16,000 | — |
| Example 13 | 4,100 | — | Comparative Example 13 | 15,000 | — |

TABLE 11-continued

|  | Mw | Foaming |  | Mw | Foaming |
| --- | --- | --- | --- | --- | --- |
| Example 14 | 6,200 | — | Comparative Example 14 | 23,000 | — |
| Example 15 | 5,300 | — | Comparative Example 15 | 18,000 | — |
| Example 16 | 5,600 | — | Comparative Example 16 | 26,000 | — |

It is clear that by controlling the temperature according to the first embodiment of the invention, a polymer having a desired molecular weight can be obtained without causing foaming.

EXAMPLE 17

In an SUS-made separable flask having a capacity of 2.5 liters and equipped with a reflux condenser and a stirrer, 175.0 g of pure water and 0.0081 g of $Fe(NH_4)_2(SO_4)_2 \cdot 6H_2O$ (Mohr's salt) were charged. The concentration of an iron ion as a heavy metal ion against the total weight of the polymerization reaction solution at the time of completion of the polymerization reaction was calculated and found to be 1 ppm. The temperature was raised to 90° C. while stirring this aqueous solution.

Next, (1) 450.0 g (5.0 moles) of an 80% acrylic acid aqueous solution (hereinafter abbreviated as "80% AA") as a monomer, (2) 20.8 g (0.25 moles) of a 48% sodium hydroxide aqueous solution (hereinafter abbreviated as "48% NaOH") for the purpose of controlling the degree of neutralization, (3) 66.7 g of a 15% sodium persulfate aqueous solution (hereinafter abbreviated as "15% NaPS") as a persulfate, and (4) 71.4 g of a 35% sodium bisulfite aqueous solution (hereinafter abbreviated as "35% SBS") as a bisulfite were added, respectively from separate dropping nozzles in the polymerization reaction solution kept at about 90° C. with stirring. The dropping time was set up at 180 minutes for 80% AA, 180 minutes for 48% NaOH, 175 minutes for 35% SBS, and 185 minutes for 15% NaPS, respectively. Also, the dropping was continuously carried out, and the dropping rate of each of the components was kept at a fixed level during the dropping.

Incidentally, the amount of the used initiator against the whole of the monomers added in the system was compared using the "amount against the input of monomer" calculated according to the following equation.

[Amount against the input of monomer (g/mole)]=[Amount of used initiator (g)]/[Input of monomer (mole)]

As is clear from the foregoing equation, the "amount against the input of monomer" of the initiator means the amount (g) of the initiator used per mole of the monomer added in the polymerization reaction solution for the purpose of obtaining the (meth)acrylic acid based polymer.

In this Example, the amount of sodium persulfate as the persulfate against the input of monomer was 2.0 g/mole. Also, the amount of sodium bisulfite as the bisulfite against the input of monomer was 5.0 g/mole.

After completion of dropping, the polymerization was completed while keeping the polymerization reaction solution at 90° C. for 30 minutes. After completion of the polymerization, the reaction solution was allowed to stand for cooling and neutralized while gradually dropping 375.0 g (4.50 moles) of 48% NaOH thereto with stirring. Incidentally, the foregoing "concentration of an iron ion (Fe) as a heavy metal ion against the total weight of the polymerization reaction solution at the time of completion of the polymerization reaction" was calculated based on the total weight of the polymerization reaction solution at this time.

The concentration of solids content in the polymerization reaction solution after neutralization was 45% by weight. The resulting poly(sodium acrylate) had an ultimate degree of neutralization of 95% by mole. Also, the resulting poly (sodium acrylate) had a weight average molecular weight of 4,900. The synthesis condition of the polymer and characteristics of the resulting polymer are summarized in Table 12.

The degree of neutralization of the resulting polymer was measured according to the following procedures.

(1) The polymerization reaction solution was subjected to neutralization titration, and a titration curve was prepared. The amount of sodium hydroxide added until the titration curve reached a point of inflection is defined as A (mole).

(2) The concentration of solids content of the polymerization reaction solution having sodium hydroxide added thereto was measured.

(3) The weight of the polymer was calculated from the concentration determined in (2) and the weight of the polymerization reaction solution prior to dropping of sodium hydroxide. This weight value is divided by the molecular weight of a sodium salt of the monomer to calculate an amount B (mole) of the monomer unit.

(4) The degree of neutralization of the resulting polymer is calculated according to the following equation.

[Degree of neutralization (%)]=[(B−A)/B]×100

EXAMPLE 18

Poly(sodium acrylate) was obtained according to the procedures as in Example 17, except for changing the weight of the Mohr's salt to be added to the polymerization reaction solution to 0.0244 g. Also, the resulting poly(sodium acrylate) had a weight average molecular weight of 4,500. The synthesis condition of the polymer and characteristics of the resulting polymer are summarized in Table 12.

EXAMPLE 19

Poly(sodium acrylate) was obtained according to the procedures as in Example 1, except for changing the weight of the Mohr's salt to be added to the polymerization reaction solution to 0.0814 g. Also, the resulting poly(sodium acrylate) had a weight average molecular weight of 4,200. The synthesis condition of the polymer and characteristics of the resulting polymer are summarized in Table 12.

EXAMPLE 20

Poly(sodium acrylate) was obtained according to the procedures as in Example 17, except for changing the weight of the Mohr's salt to be added to the polymerization reaction solution to 0.0242 g, changing the amount of initially charged water to 178.0 g and changing the dropping amount of 35% SBS to 57.1 g (amount against the input of the monomer: 4.0 g/mole). Also, the resulting poly(sodium acrylate) had a weight average molecular weight of 6,000. The synthesis condition of the polymer and characteristics of the resulting polymer are summarized in Table 12.

EXAMPLE 21

Poly(sodium acrylate) was obtained according to the procedures as in Example 17, except for changing the weight of the Mohr's salt to be added to the polymerization reaction solution to 0.0242 g, changing the amount of initially charged water to 197.0 g and changing the dropping amount of 15% NaPS to 33.3 g (amount against the input of the monomer: 1.0 g/mole). Also, the resulting poly(sodium acrylate) had a weight average molecular weight of 5,200. The synthesis condition of the polymer and characteristics of the resulting polymer are summarized in Table 12.

EXAMPLE 22

Poly(sodium acrylate) was obtained according to the procedures as in Example 17, except for changing the weight of the Mohr's salt to be added to the polymerization reaction solution to 0.0240 g, changing the amount of initially charged water to 204.0 g and changing the dropping amount of 15% NaPS to 16.7 g (amount against the input of the monomer: 0.5 g/mole). Also, the resulting poly(sodium acrylate) had a weight average molecular weight of 6,000. The synthesis condition of the polymer and characteristics of the resulting polymer are summarized in Table 12.

COMPARATIVE EXAMPLE 17

Poly(sodium acrylate) was obtained according to the procedures as in Example 17, except for not adding the Mohr's salt. Also, the resulting poly(sodium acrylate) had a weight average molecular weight of 5,900. The synthesis condition of the polymer and characteristics of the resulting polymer are summarized in Table 12.

with an increase in the concentration of the heavy metal ion. In this way, the heavy metal ion influences the efficiency of the initiator, and its effect increases with an increase of the amount thereof.

In Example 20 (Mw=6,000), Example 22 (Mw=6,000) and Comparative Example 17 (Mw=5,900), nevertheless the use amounts of the persulfate and the bisulfite were different, polymers having a similar weight average molecular weight were obtained. It can be understood from the foregoing that by adding a very small amount of a heavy metal ion to the polymerization reaction solution, the use amounts of the persulfate and the bisulfite can be reduced. Namely, in order to prepare the polymer of Comparative Example 17, 2.0 g/mole of NAPS (persulfate) and 5.0 g/mole of SBS (bisulfite) were necessary. By adding a very small amount of a heavy metal ion to the polymerization reaction solution, the use amount of NaPS can be reduced to 0.5 g/mole in Example 22. This means that NaPS-derived impurities are reduced by 75% according to simple calculation. In this way, it is designed to largely reduce impurities according to the production process of the invention.

By containing a heavy metal ion in a polymerization reaction solution, the amount of impurities contained in a formed (meth)acrylic acid based polymer lowers. By using a (meth)acrylic acid based polymer having less amounts of impurities, the quality of a product to which the polymer is applied is also improved.

When the amount of an initiator to be used is small, such is advantageous from the standpoint of manufacturing costs.

TABLE 12

| | | Example 17 | Example 18 | Example 19 | Example 20 | Example 21 | Example 22 | Comparative Example 17 |
|---|---|---|---|---|---|---|---|---|
| Amount of initially charged Mohr's salt | (g) | 0.0081 | 0.0244 | 0.0814 | 0.0242 | 0.0242 | 0.0240 | 0 |
| Fe concentration * | (ppm) | 1 | 3 | 10 | 3 | 3 | 3 | 0 |
| Amount of initially charged pure water | (g) | 175.0 | 175.0 | 175.0 | 178.0 | 197.0 | 204.0 | 175.0 |
| Dropping amount of 15% NaPS aq | (g) | 66.7 | 66.7 | 66.7 | 66.7 | 33.3 | 16.7 | 66.7 |
| Amount of NaPS against the input of monomer | (g/mole) | 2.0 | 2.0 | 2.0 | 2.0 | 1.0 | 0.5 | 2.0 |
| Dropping amount of 35% SBS aq | (g) | 71.4 | 71.4 | 71.4 | 57.1 | 71.4 | 71.4 | 71.4 |
| Amount of SBS against the input of monomer | (g/mole) | 5.0 | 5.0 | 5.0 | 4.0 | 5.0 | 5.0 | 5.0 |
| Degree of neutralization after dropping | (%) | 5.0 | 5.0 | 5.0 | 5.0 | 5.0 | 5.0 | 5.0 |
| Ultimate degree of neutralization | (%) | 95.0 | 95.0 | 95.0 | 95.0 | 95.0 | 95.0 | 95.0 |
| Total charge amount | (g) | 1,159 | 1,159 | 1,159 | 1,148 | 1,148 | 1,138 | 1,159 |
| Weight average molecular weight of polymer | (Mw) | 4,900 | 4,500 | 4,200 | 6,000 | 5,200 | 6,000 | 5,900 |

* The Fe concentration is a concentration of an iron ion as a heavy metal ion against the total weight of the polymerization reaction solution at the time of completion of the polymerization reaction.

As shown in Table 12, by containing a heavy metal ion in the polymerization reaction solution, the effect of the initiator is improved. For example, when Example 17 is compared with Comparative Example 17, by adding only 1 ppm of a heavy metal ion to the polymerization reaction solution, the weight average molecular weight of the resulting polymer is lowered by about 20%. It is estimated that this is caused due to the matter that the efficiency of the initiator increases by the addition of a heavy metal ion.

As demonstrated in Examples 17 to 19, the weight average molecular weight of the resulting polymer was reduced Further, when the amount of the initiator to be used is reduced, the amount of sulfurous acid gas generated from the polymerization reaction solution can be reduced. For that reason, safety in the polymerization reaction is improved.

What is claimed is:

1. A process of producing a polymer comprising subjecting a monomer to aqueous solution polymerization while controlling the temperature using at least one device of an external circulation device and an internal coil device each having heat exchanging function.

2. The process of producing a polymer according to claim 1, wherein the monomer is a (meth)acrylic acid based monomer.

3. The process of producing a polymer according to claim 1 or 2, wherein the polymerization temperature is 50° C. or higher but lower than the boiling point.

4. The process of producing a polymer according to claim 1 or 2, wherein the polymerization reaction solution contains one or more heavy metal ions.

5. The process of producing a polymer according to claim 3, wherein the polymerization reaction solution contains one or more heavy metal ions.

6. The process of producing a polymer according to claim 4, wherein the heavy metal ions are one or more iron ions.

7. The process of producing a polymer according to claim 5, wherein the heavy metal ions are one or more iron ions.

8. The process of producing a polymer according to claim 1 or 2, wherein the polymerization reaction is carried out while adding the monomer for an addition period of time in the range of from 1 to 8 hours.

9. The process of producing a polymer according to claim 3, wherein the polymerization reaction is carried out while adding the monomer for an addition period of time in the range of from 1 to 8 hours.

10. The process of producing a polymer according to claim 1 or 2, wherein the polymerization reaction solution has a viscosity of not more than 1,000 mPa·s.

11. The process of producing a polymer according to claim 3, wherein the polymerization reaction solution has a viscosity of not more than 1,000 mPa·s.

12. The process of producing a polymer according to claim 1 or 2, wherein a solution flow rate of the external circulation device is from 0.01 to 15% by volume of the total charge amount of the polymer solution per minute.

13. The process of producing a polymer according to claim 3, wherein a solution flow rate of the external circulation device is from 0.01 to 15% by volume of the total charge amount of the polymer solution per minute.

14. The process of producing a polymer according to claim 1 or 2, wherein a solution holding amount of the external circulation device is from 1 to 30% by volume of the total charge amount of the polymer solution.

15. The process of producing a polymer according to claim 3, wherein a solution holding amount of the external circulation device is from 1 to 30% by volume of the total charge amount of the polymer solution.

16. A process for producing a (meth)acrylic acid based polymer by polymerizing a (meth)acrylic acid based monomer in a polymerization reaction solution, wherein the polymerization reaction solution contains one or more of a persulfate and one or more of a bisulfite as the initiator, and the polymerization reaction solution contains one or more heavy metal ions in an amount of 0.1 to 30 ppm.

17. The process for producing a (meth)acrylic acid based polymer according to claim 16, wherein the heavy metal ions are one or more iron ions.

\* \* \* \* \*